(12) United States Patent
Jugl et al.

(10) Patent No.: US 12,465,692 B2
(45) Date of Patent: Nov. 11, 2025

(54) DOSING MECHANISM WITH ROTATIONAL END STOP MECHANISM FOR TERMINATING DOSE DISPENSE

(71) Applicant: Sanofi, Paris (FR)

(72) Inventors: Michael Jugl, Frankfurt am Main (DE); Stefan Blancke, Frankfurt am Main (DE)

(73) Assignee: Sanofi, Paris (FR)

( * ) Notice: Subject to any disclaimer, the term of this patent is extended or adjusted under 35 U.S.C. 154(b) by 704 days.

(21) Appl. No.: 17/781,906

(22) PCT Filed: Dec. 3, 2020

(86) PCT No.: PCT/EP2020/084385
§ 371 (c)(1),
(2) Date: Jun. 2, 2022

(87) PCT Pub. No.: WO2021/110801
PCT Pub. Date: Jun. 10, 2021

(65) Prior Publication Data
US 2023/0014860 A1    Jan. 19, 2023

(30) Foreign Application Priority Data

Dec. 6, 2019   (EP) .................................. 19306587

(51) Int. Cl.
*A61M 5/315* (2006.01)
(52) U.S. Cl.
CPC .... *A61M 5/31501* (2013.01); *A61M 5/31541* (2013.01); *A61M 5/31551* (2013.01)
(58) Field of Classification Search
CPC .......... A61M 5/31501; A61M 5/31541; A61M 5/31551
See application file for complete search history.

(56) References Cited

U.S. PATENT DOCUMENTS

| 6,004,297 A | 12/1999 | Steenfeldt-Jensen et al. |
| 8,048,037 B2 * | 11/2011 | Kohlbrenner ........... A61M 5/24 604/218 |

(Continued)

FOREIGN PATENT DOCUMENTS

| CN | 106794309 A | 5/2017 |
| CN | 109952121 A | 6/2019 |

(Continued)

OTHER PUBLICATIONS

International Preliminary Report on Patentability in International Appln. No. PCT/EP2020/084385, mailed on Jun. 16, 2022, 7 pages.

(Continued)

*Primary Examiner* — Dung T Ulsh
(74) *Attorney, Agent, or Firm* — Bond Schoeneck & King, PLLC

(57) ABSTRACT

A dosing mechanism for a drug delivery device is provided for selecting and dispensing user-variable doses of a medicament. The mechanism includes a housing, a piston rod, and a drive configured to rotate the piston rod and/or a movement application component directly engaged with the piston rod in a dispense rotational direction relative to the housing. A rotational end-stop mechanism terminates dose dispense and includes a first engagement element rotationally fixed to the piston rod and/or the movement application component, and a second engagement element that is constrained against rotation relative to the housing at the end of dose dispense. To improve dose accuracy, the second engagement element remains out of direct engagement with the first engagement element during dispensing, and only at the end of dose dispense directly engages the first engagement element to provide a rotational stop. A drug delivery device incorporating the dosing mechanism is also disclosed.

20 Claims, 9 Drawing Sheets

(56) References Cited

U.S. PATENT DOCUMENTS

| | | |
|---|---|---|
| 10,245,383 B2 * | 4/2019 | Moeller .............. A61M 5/3155 |
| 10,426,893 B2 | 10/2019 | Marsh et al. |
| 2004/0210199 A1 | 10/2004 | Atterbury et al. |
| 2009/0247951 A1 | 10/2009 | Kohlbrenner et al. |
| 2016/0030678 A1 | 2/2016 | Bayer et al. |
| 2016/0045673 A1 | 2/2016 | Bayer et al. |
| 2017/0151392 A1 | 6/2017 | Marsh et al. |
| 2017/0157330 A1 * | 6/2017 | Marsh .................... A61M 5/20 |
| 2018/0071460 A1 | 3/2018 | Rekaya et al. |

FOREIGN PATENT DOCUMENTS

| | | |
|---|---|---|
| EP | 2455122 A1 | 5/2012 |
| EP | 2076303 | 7/2018 |
| JP | 2015526217 A | 9/2015 |
| JP | 2017520367 A | 7/2017 |
| JP | 2017536936 A | 12/2017 |
| JP | 2019193857 A | 11/2019 |
| WO | 1999038554 A1 | 8/1999 |
| WO | WO 1999/038553 | 8/1999 |
| WO | WO 1999/038554 | 8/1999 |
| WO | WO 2008/031239 | 3/2008 |
| WO | WO 2016/055627 A1 | 4/2016 |
| WO | WO 2018/002314 A1 | 1/2018 |

OTHER PUBLICATIONS

International Search Report and Written Opinion in International Appln. No. PCT/EP2020/084385, mailed on Feb. 19, 2021, 9 pages.
Notice of Reason(s) for Rejection, JP Patent Application No. 2022-533409, dated Sep. 3, 2024, pp. 1-5 (with pp. 1-3 being a translation).

* cited by examiner

DOSING MECHANISM WITH ROTATIONAL END STOP MECHANISM FOR TERMINATING DOSE DISPENSE

CROSS REFERENCE TO RELATED APPLICATIONS

The present application is the national stage entry of International Patent Application No. PCT/EP2020/084385, filed on Dec. 3, 2020, and claims priority to Application No. EP 19306587.7, filed on Dec. 6, 2019, the disclosures of which are incorporated herein by reference.

TECHNICAL FIELD

The present disclosure is generally directed to a dosing mechanism for a drug delivery device, for example a pen type drug delivery device, for selecting and dispensing a number of user-variable doses of a medicament. Further, the present disclosure relates to such a drug delivery device.

BACKGROUND

Pen type drug delivery devices have application where regular injection by persons without formal medical training occurs. This may be increasingly common among patients having diabetes where self-treatment enables such patients to conduct effective management of their disease. In practice, such a drug delivery device allows a user to individually select and dispense a number of user variable doses of a medicament. The present disclosure is not directed to so-called fixed dose devices, which only allow dispensing of a predefined dose without the possibility to increase or decrease the set dose.

There are basically two types of drug delivery devices: resettable devices (i.e., reusable) and non-resettable (i.e., disposable). For example, disposable pen delivery devices are supplied as self-contained devices. Such self-contained devices do not have removable pre-filled cartridges. Rather, the pre-filled cartridges may not be removed and replaced from these devices without destroying the device itself. Consequently, such disposable devices do not need to have a resettable dosing mechanism. The present disclosure is applicable for both types of devices, i.e. for disposable devices as well as for reusable devices.

These types of pen delivery devices (so named because they often resemble an enlarged fountain pen) generally comprise three primary elements: a cartridge section that includes a cartridge often contained within a housing or holder; a needle assembly connected to one end of the cartridge section; and a dosing section connected to the other end of the cartridge section. A cartridge (often referred to as an ampoule) typically includes a reservoir that is filled with a medication (e.g., insulin), a movable rubber type bung or stopper located at one end of the cartridge reservoir, and a top having a pierceable rubber seal located at the other, often necked-down, end. A crimped annular metal band is typically used to hold the rubber seal in place. While the cartridge housing may be typically made of plastic, cartridge reservoirs have historically been made of glass. The dosing section comprises or consists of the dosing mechanism.

The needle assembly is typically a replaceable double-ended needle assembly. Before an injection, a replaceable double-ended needle assembly is attached to one end of the cartridge assembly, a dose is set, and then the set dose is administered. Such removable needle assemblies may be threaded onto, or pushed (i.e., snapped) onto the pierceable seal end of the cartridge assembly.

Said one end of the drug delivery device may be referred to as a distal end of the drug delivery device. The opposite end of the drug delivery device along an axial direction may be referred to as a proximal end of the drug delivery device. Accordingly, it can be distinguished between a distal direction and a proximal direction. The distal direction is parallel to the axial direction and points from the proximal end of the drug delivery device to the distal end of the proximal end of the drug delivery device, whereas the proximal direction is also parallel to the axial direction but points from said distal end of the drug delivery device towards said proximal end of the drug delivery device.

The dosing section or dosing mechanism is typically the portion of the pen device that is used to set (select) a dose. Furthermore, it propels dose dispense: During an injection, a spindle or piston rod contained within the dosing mechanism presses against the bung or stopper of the cartridge. This force causes the medication contained within the cartridge to be ejected through an attached needle assembly. After an injection, as generally recommended by most drug delivery device and/or needle assembly manufacturers and suppliers, the needle assembly is removed and discarded.

A further differentiation of drug delivery device types refers to the driving mechanism: There are devices which are manually driven, e.g. by a user applying a force to a dispense knob, devices which are driven by a spring or the like and devices which combine these two concepts, i.e. spring assisted devices which still require a user to exert an injection force.

The spring-type devices involve springs which are preloaded and springs which are loaded by the user during dose selecting. Some stored-energy devices use a combination of spring preload and additional energy provided by the user, for example during dose setting.

Many pen type drug delivery devices for selecting and dispensing a number of user-variable doses of a medicament comprise a number sleeve, which is threadedly engaged to a housing of the dosing mechanism. When no dose is set, usually at least most of an axial length of the number sleeve is inserted into this housing. The number sleeve is rotated during dose setting. In more detail, during increasing a set dose, the number sleeve rotates in a dose increase rotational direction and, at the same time, it moves axially in the proximal direction with respect to the housing due to the threaded engagement with the latter. During decreasing the set dose, the number sleeve rotates in a dose decrease rotational direction (which is opposite to the dose increase rotational direction) and, at the same time, it moves distally back into the housing due to the threaded engagement with the latter. In other words, the number sleeve helically winds out of the housing in the proximal direction when the dose is increased and winds back into the housing in the distal direction when the dose is decreased. In many cases, a dose setting ring is fixed to a proximal end of the number sleeve in order to allow the user to rotate the dose setting ring and hence the number sleeve more easily. This facilitates to set a desired dose.

Often, the dose can be increased and decreased only in predetermined steps (dosage units) corresponding to a certain amount of the medicament. Accordingly, one user variable dose can correspond to one or several dosage units.

In many of such pen type drug delivery devices, a dispense knob is mounted centrally at the proximal end of the drug delivery device. Often, the dispense knob is at least partly inserted into the dose setting ring.

After the user-variable dose is set, the user presses the dispense knob to start dose dispense. In some cases, the dispense knob may exhibit limited axial movement with regard to the dose setting ring in order to switch the state of one or more clutches in the dosing mechanism in order to allow dose dispense. By pressing the dispense knob further towards the distal direction, the number sleeve is wound back into the housing due to the threaded engagement with the latter. During dose dispense, a driving mechanism of the dosing mechanism transmits the distal movement of the dispense knob and/or the rotational movement of the number sleeve to the piston rod. At the end, the piston rod moves in the distal direction.

In such pen type drug delivery devices, dose dispense is terminated by dose dispense end stop for the dose setting ring. For example, the dose setting ring abuts on a proximal end surface of the housing when the number sleeve is wound completely into the housing. Consequently, further movement of the dose setting ring, the dispense knob and the number sleeve in the distal direction is prevented. Due to the threaded engagement of the number sleeve with the housing, further rotation of the dose setting ring and the number sleeve in the dose decrease rotational direction is also prevented. In other words, there is no further distal movement of the dispense knob and/or rotational movement of the number sleeve which could be transmitted by the driving mechanism. Accordingly, dose dispense is terminated by this dose dispense end stop.

In other embodiments, a rotational stop means of the housing engages a rotational stop means of the dose setting ring at the end of dose dispense for terminating dose dispense. Due to the threaded engagement of the number sleeve with the housing, further distal movement of the dose setting ring and the number sleeve also prevented. Hence, there is no further distal movement of the dispense knob and/or rotational movement of the number sleeve which could be transmitted by the driving mechanism. The engagement of the rotational stops means of the dose setting ring and the housing hence stops dose dispense. After dose dispense has been terminated, the number sleeve and the dose setting ring are in their zero dose (initial state, no dose is set) position again. The amount of medicament dispensed corresponds to the travel of the number sleeve from the position when the dose is set to its zero dose position.

However, suitable dosing mechanisms are complex and consist of many different individual components. In particular, the movement of the dose setting ring during dose dispense is typically coupled to the movement of the piston rod during dose dispense via a plurality of individual intermediate components, which all move during dose dispense. All these parts form a kinematic chain. The entirety of intermediate components may include dosing sleeves, drive sleeves, clutches, nuts, springs, ratchet means, etc., for example. Individual manufacturing tolerances and individual wear of the components of the kinematic chain (i.e. the dose setting ring, the piston rod, and said intermediate components) as well as the manufacturing tolerances due to assembly of the whole mechanism sum up. Furthermore, different dimensional changes of the individual components of the kinematic chain, for example due to temperature changes or changes in humidity, can occur in addition. Even if the tolerances and different dimensional changes partially compensate in some cases, they might sum up in a more unfortunate manner in other cases. Finally, the accuracy of the dosing mechanism can be impaired.

US 2017/0157330 A1 discloses a drug delivery device in form of an injection pen for selecting and dispensing a number of user-variable doses of a medicament.

A further injection device is shown in WO 2008/031239 A1. It comprises a mechanism for setting and distributing a dose that is housed in a housing sleeve.

SUMMARY

It is an object of the present disclosure to provide a dosing mechanism and a drug delivery device exhibiting improved dose delivery accuracy.

This object is solved by a dosing mechanism according to claim 1.

Said dosing mechanism for a drug delivery device for selecting and dispensing a number of user-variable doses of a medicament comprises a housing and a piston rod.

Further, the dosing mechanism includes a driving mechanism for rotating
  the piston rod and/or
  a movement application component, which is directly engaged with the piston rod,
  (respectively) in a dispense rotational direction with respect to the housing for dose dispense.

The dosing mechanism comprise a rotational end stop mechanism for terminating dose dispense. The rotational end stop mechanism comprises a first engagement means, wherein the first engagement means is rotationally fixed with respect to the piston rod and/or the movement application component, and a second engagement means, wherein the second engagement means is prevented from rotation with respect to the housing in the dispense rotational direction (at least) at an end of dose dispense.

According to the disclosure, the second engagement means is not directly engaged with the first engagement means during dose dispense.

The second engagement means, at the end of dose dispense, directly engages the first engagement means and constitutes a rotational stop for the first engagement means to prevent the first engagement means from further rotation in the dispense rotational direction with respect to the housing.

Accordingly, the piston rod and/or the movement application component is/are prevented from further rotation in the dispense rotational direction with respect to the housing at the end of dose dispense. Thus, it is assured that further movement of the piston rod is prevented at the end of dose dispense.

In other words, the rotational end stop mechanism provides a rotational end stop or rotational lock for the piston rod and/or the movement application component at the end of dose dispense, at least with regard to further rotation in the dispense rotational direction with regard to the housing.

Hence, an end state of the dosing mechanism at the end of dose dispense is defined more precisely (especially, for example, an end position of the driving mechanism at the end of dose dispense). In other words, the end state of the dosing mechanism is approached with greater accuracy, repeatability, and reliability. As a result, the dose dispense accuracy of the dosing mechanism and hence the dose dispense accuracy of the drug device as a whole are improved, respectively. Surprisingly, the accuracy is considerably improved although only the end state is defined more precisely. However, as the dispensed dose corresponds to the total distal movement of the piston rod, the accuracy of dose dispense is only determined by the end state and a dose set state. The dose set state is the state directly before the start of dose dispense. In the dose set state, a dose different from zero has been set by the user. As the rotational end stop mechanism directly acts on the piston rod or at least directly on the movement application component, which is directly engaged with the piston rod, finally an axial end position of the piston rod is determined very directly and very precisely. Hence, even if only the end state of the dosing mechanism is defined more precisely, the accuracies of the overall dosing mechanism and drug delivery are considerably improved.

As the second engagement means is disengaged from the first engagement means during dose dispense, the rotational stop mechanism does not impair dose dispense. In particular, the rotational stop mechanism does not cause additional resistance while performing dose dispense. Hence, the rotational stop mechanism does not make dose dispense more difficult for the user.

If two components or means are "directly engaged" in terms of the present application, this indicates that they directly mechanically interact with each other. There is no additional, intermediate component between said two components for coupling them to each other. Furthermore, at least a part of each of the two components or means touches or abuts the other component or means directly. For example, two directly engaged components may mesh directly with each other by spline means, ratchet teeth, and/or thread means.

In general, it is not necessary that the dosing mechanism comprises a movement application device. In a preferred embodiment, the piston rod is directly engaged with the driving mechanism and the dosing mechanism does not comprise any movement application component.

As noted above, the movement application component (if any is provided) is directly engaged with the piston rod. This means that the movement application component directly mechanically interacts with the piston rod. There is no additional, intermediate component between the movement application component and the piston rod for coupling the movement application component to the piston rod. Preferably, the driving mechanism directly engages the movement application component. If the movement application component is provided, the piston rod may not directly engage the driving mechanism directly but only via the movement application device. Additionally or alternatively, the movement application component may be axially fixed with respect to the housing.

In a preferred embodiment of the disclosure, the movement application is a piston rod sleeve. The piston rod is inserted in the piston rod sleeve. Most preferably, the piston rod sleeve is prevented from rotation opposite to the dispense rotational direction with respect to the housing. By this, the piston rod sleeve prevents the piston rod from undesired backward motion during dose setting.

More preferably, the piston rod sleeve is directly rotationally fixed to the piston rod. Hence, the piston rod sleeve may transmit rotation from the driving mechanism to the piston rod during dose dispense.

According to another preferred embodiment of the disclosure, the movement application component is a nut means that is threadedly engaged directly with the piston rod.

According to a preferred embodiment of the present disclosure, the piston rod rotates in the dispense rotational direction with respect to the housing for dose dispense. For example, the driving mechanism is configured for rotating the piston rod directly. According to another example, the driving mechanism rotates the movement application component directly for dose dispense, and the movement application component transfers the rotation to the piston rod.

More preferably, the piston rod is threadedly engaged with the housing and this threaded engagement is configured for moving the piston rod in the distal direction with respect to the housing when the piston rod rotates in the dispense rotational direction. Accordingly, the piston rod moves in the distal direction during dose dispense. For example, the housing may comprise an inner thread engaging outer thread of the piston rod. This outer thread is also referred to as "first outer thread", as the piston rod may comprise several (more than one) outer threads in some preferred embodiments. The first outer thread has a first pitch.

Most preferably, the housing comprises an insert, which is rotationally and axially fixed to the housing, wherein the piston rod is threadedly engaged with said insert. For example, the insert may comprise the inner thread mentioned above engaging the first outer thread of the piston rod.

It has to be noted that such an (inner) thread of the housing for the piston rod is not part of the driving mechanism in terms of this application. The first outer thread of the piston rod is not a part of the driving mechanisms, either. The inner thread of the housing and the first outer thread of the piston rod do not drive the piston rod or any movement application component, which is directly engaged with the piston rod, for rotation in that case. Instead, they merely transform the rotation of the piston rod, which has been already introduced by the driving mechanism, into the distal movement of the piston rod.

According to another embodiment of the disclosure, the piston rod is rotationally fixed but axially movable with respect to the housing in this case. In this case, the driving mechanism is configured for directly rotationally driving the movement application component in the dispense rotational direction with respect to the housing for dose dispense. The engagement of the movement application component with the piston rod transforms the movement of the movement application component in the dispense rotational direction during dose dispense into movement of the piston rod in the distal direction. In this case, the movement application component can be the nut means that is threadedly engaged with the piston rod, for example. The nut means may comprise an inner thread engaging an outer thread of the piston rod. In such an embodiment, the nut means is the last component of the dosing mechanism which rotates during dose dispense. It is preferred that the nut means is axially fixed with respect to the housing.

It has to be noted that the nut means according to this embodiment is not part of the driving mechanism in terms of this application because it does not drive the piston rod or any movement application component, which is directly engaged with the piston rod, for rotation. Instead, the nut means only transform the rotation output of the driving mechanism into purely distal movement of the piston rod. Hence, in terms of the present disclosure, the nut means only constitutes the movement application component of this embodiment.

In an embodiment of the present disclosure, the dosing mechanism comprises a dose setting unit. More preferably, the dose setting unit is rotatable during dose setting. The dose setting unit may be rotatable in a dose increase rotational direction with respect to the housing for increasing the set dose during dose setting. In addition, the dose setting unit may be rotatable in a dose decrease rotational direction with respect to the housing, which is opposite to the dose increase rotational direction, for decreasing the set dose during dose setting. The dose setting unit may be in a zero dose position if no dose is set or if the set dose is decreased completely to zero. In the zero dose position, the dose setting unit may not be rotatable (further) in the dose decrease rotational direction. This allows easy and accurate dose setting.

According to another aspect, the dose setting unit may be configured to rotate during dose dispense. More preferably, the dose setting unit is configured to rotate in the dose decrease rotational direction with respect to the housing during dose dispense. The dispense rotational direction may be identical with or opposite to the dose decrease rotational direction.

Additionally or alternatively, the dose setting unit may be configured for being moved in a distal direction with respect to the housing during dose dispense. In particular, the dose setting unit may be configured to be pressed in the distal direction for dose dispense, for example by the user.

More preferably, the dose setting unit is threadedly engaged with the housing. For example, the dose setting unit comprises an outer thread that is engaged with an inner thread of the housing. The outer thread may comprise or consist of one or several grooves, which helically extend in an outer surface of the dose setting unit. Most preferably, the housing comprises an insert, which is rotationally and axially fixed to the housing, and the dose setting unit is threadedly engaged to said insert. Especially, the dose setting unit may be directly threadedly engaged with the housing and/or the insert thereof. The threaded engagement ensures proper, accurate and reliable guidance of the dose setting unit within the housing.

If the dose setting unit is rotated in the dose increase rotational direction, it may move in a proximal direction with respect to the housing due to the threaded engagement with the housing. Accordingly, if the dose setting unit is rotated in the dose decrease rotational direction, the dose setting unit moves in the distal direction due to the threaded engagement with the housing. In an even more preferred embodiment, the dose setting unit helically winds out the housing in the proximal direction when it is rotated in the dose increase direction and it helically winds back into the housing in the distal direction when it is rotated in the dose decrease direction. This dial extension provides haptic feedback to the user that a dose is set and how large the set dose is.

Furthermore, if the dose setting unit is threadedly engaged to the housing, the distal movement of the dose setting unit during dose dispense causes also a rotational movement of the dose setting unit in the dose decrease rotational direction during dose dispense. In particular, the dose setting unit may helically wind back in the distal direction during dose dispense. Most preferably, the dose setting unit winds back into the housing during dose dispense. This provides haptic feedback regarding dose setting to the user. The user may even recognize by the remaining dial extension to what extent dose dispense has been completed.

The dose setting unit may comprise or consist of a number sleeve. It may be the number sleeve that is threadedly engaged with the housing or the insert, especially directly threadedly engaged. For example, the outer thread of the dose setting unit may be provided on an outer surface of the number sleeve (which is, therefore, the outer surface of the dose setting unit mentioned above in this case).

The dose setting unit may further comprise a dose setting ring which is mounted to the number sleeve. For example, the dose setting ring may be rotationally fixed to the number sleeve. Most preferably, the dose setting ring is rotationally and axially fixed to the number sleeve. In particular, the dose setting ring may be formed integrally with the number sleeve.

The dosing mechanism may comprise a dose dispense end stop for the dose setting unit. The dose dispense end stop is configured for terminating movement of the dose setting unit with regard to the housing at the end of dose dispense. The dose dispense end stop may comprise a rotational stop means and/or an axial stop means for terminating the corresponding movement of the dose setting unit with respect to the housing at the end of dose dispense. In particular, the dose setting unit may rotationally abut in the dispense rotational direction due to the rotational stop means at the end of dose dispense. Additionally or alternatively, the dose setting unit may axially abut in the distal direction due to the axial stop means at the end of dose dispense. This is one way to ensure the end of dose dispense. On the other hand, even if the end of dose dispense is obtained in a different manner, the dose dispense end stop ensures that the dose setting unit cannot be moved further at the end of dose dispense and hence gives a feedback to the user that end of dose dispense has been reached.

The dose dispense end stop must not be confused with the rotational end stop mechanism. The dose dispense end stop acts directly only on the dose setting unit. In contrast, the rotational end stop mechanism acts directly on the piston rod and/or the movement application component.

Additionally or alternatively, the driving mechanism may be configured for transmitting the rotational movement and/or the distal movement of the dose setting unit for rotating the piston rod and/or the movement application component in the dispense rotational direction during dose dispense. In this regard, "transmitting" includes "transforming" (e.g. by a reduction mechanism, see below). Hence, if the dosing mechanism comprises the dose dispense end stop according to any of the embodiments described above, the dose dispense end stop is capable of terminating dose dispense. When the dose setting unit cannot be moved further for dose dispense, no more movement is transmitted to the piston rod and/or to the movement application component. Consequently, dose dispense stops. This is also referred to as "indirect stop mechanism" for terminating dose dispense.

Preferably, the dosing mechanism comprises a reduction mechanism. A total distal movement of the piston rod during dose dispense is proportional to a total distal movement of the dose setting unit during dose dispense multiplied by a reduction factor R. More preferably, the reduction factor R is more than zero but less one (0<R<1). In other words, the total distal movement of the piston rod during dose dispense is proportional to but less than the total distal movement of the number sleeve and/or the dose setting ring during dose dispense. Due to the reduction function, a dispense force for the user, which is required to perform dose dispense, is reduced. In addition, a total axial travel of the dose setting unit corresponding to the set dose is increased. This facilitates setting the desired dose correctly. Furthermore, due to the larger total distal travel of the dose setting unit during dose setting, a visible and/or haptic indication of the set dose is enlarged and hence can be easier and more precisely perceived. Hence, the reduction function facilitates using the device and improves the safety of the device. The advantages are of particular importance for users with impaired visual abilities, cognitive abilities and/or dexterity.

The driving mechanism may comprise a drive sleeve for driving the piston rod. The drive sleeve may directly engage the piston rod. Most preferably, the drive sleeve may be directly threadedly engaged with the drive sleeve. In such an embodiment, the dosing mechanism does not comprise a movement application component in terms of the present disclosure. The piston rod may be inserted into an interior of the drive sleeve. Accordingly, the drive sleeve may surround the piston rod over at least a part of a length of the piston rod in the axial direction. Said part may depend on the state of the dosing mechanism, in particular on which dose is set and on how much dosage units had been ejected before.

For example, an inner thread of the drive sleeve may be threadedly engaged to a second outer thread of the piston rod at a distal end of the latter. In particular, the second outer thread of the piston rod may have a second pitch different from the first pitch mentioned above. In one highly preferred embodiment, the drive sleeve is prevented from rotation with respect to the housing during dose dispense. In contrast, the drive sleeve is rotatable during dose setting. Furthermore, the drive sleeve moves distally during dose dispense. The drive sleeve may be axially fixed with respect to the dose setting unit, in particular with respect to the number sleeve. Hence, due to the inner thread of the drive sleeve engaging the second outer thread of the piston rod, the piston rod is rotated during dose setting. Further, due to the threaded engagement of first outer thread of the piston rod with the inner thread of the housing (or the insert thereof), the piston rod also moves distally during dose dispense. If the second pitch of the second outer thread of the piston rod is larger than the first pitch of the first outer thread of the piston rod, a reduction mechanism can be implemented by this way.

In an embodiment of the present disclosure, at least one intermediate component of a kinematic chain of the driving mechanism is mechanically bypassed at the end of dose dispense. During dose dispense, the at least one intermediate component of the kinematic chain is not mechanically bypassed. Accordingly, at the end of dose dispense, the dose dispense end stop of the dose setting unit is transmitted to the piston rod and/or the movement application component via an additional transmission path. As a result, the indirect stop mechanism is bypassed by the more direct additional transmission path. The effect of the dose dispense end stop is transmitted more accurate to the piston rod. In contrast, the additional transmission path is inactive (broken off) during dose dispense. Hence, the mechanical bypass does not impair dose dispense before the end of dose dispense.

More preferably, the at least one intermediate component of the kinematic chain of the driving mechanism is mechanically bypassed at the end of dose dispense due to the direct engagement of the second engagement with the first engagement means. The additional transmission path for transmitting the dose dispense end stop for the dose setting unit to the piston rod and/or the movement application component is established (closed) at the end of dose dispense by the second engagement means directly engaging the first engagement means. As the second engagement means is not directly engaged with the first engagement means during dose dispense, the additional transmission path is broken up then.

By bypassing the at least one intermediate component at the end of dose dispense, the effect of the dose dispense end stop of the dose setting unit is transmitted more directly and more precisely to the piston rod and/or the movement application component. Tolerances of the bypassed intermediate component and related to the engagement of the bypassed intermediate component with other components of the kinematic chain cannot longer impede the correct end of dose dispense. Thus, an end state of the driving mechanism at the end of dose dispense is defined more precisely (especially, for example, an end position of the piston rod and/or the movement application component at the end of dose dispense). As a result, the dose dispense accuracy of the dosing mechanism and hence the dose dispense accuracy of the drug device are improved, respectively.

More preferably, the additional transmission path bypasses the reduction mechanism. This means that the effect of the dose dispense end stop is transmitted by the additional transmission path without the reduction factor R. Dosing mechanisms with reduction mechanism are prone to inaccuracy to a particularly high degree regarding correct transmission of the dose dispense end stop to the piston rod. The reduction mechanism requires a particularly large number of intermediate transmission parts between the dose setting unit and the piston rod and/or the movement application component. Hence, there are more manufacturing tolerances in total, and more individual components can be subject to wear. Moreover, the reduction mechanism should be operable smoothly such that no additional considerable mechanical resistance makes dose dispense more difficult to the user. Accordingly, a certain degree of tolerances between different components of the reduction mechanism engaging each other may be accepted to assure smooth running of the reduction mechanism under any circumstances. Finally, more individual elements can exhibit different dimensional changes, for example, due to temperature changes or changes in humidity. Even if the tolerances and inaccuracies at least partially compensate in many cases, they might sum up in a more unfortunate manner in other cases and eventually, the accuracy of the dosing mechanism can be impaired. Consequently, it is especially favorable to bypass the effect of the dose dispense end stop for the dose setting unit past the reduction mechanism.

For example, the dose dispense end stop comprises the rotational stop means and the additional transmission path couples the piston rod and/or the movement application component directly to the number sleeve at the end of dose dispense such that further rotation of the piston rod and/or the movement application component in the dispense rotational direction with regard to the number sleeve is prevented then.

According to another aspect, the additional transmission path more preferably completely bypasses the driving mechanism, even more preferred even the dose setting unit. For example, the additional transmission path may be establish directly between the piston rod and/or the movement application component at the one hand and the housing and/or an insert, which is at least directly rotationally fixed to the housing, at the one hand.

In this case, the additional transmission path does extend neither through any component of the driving mechanism nor through any component of the dose setting unit.

Particularly, this applies if the second engagement means is rotationally fixed to the housing (i.e. permanently rotationally fixed to the housing). In this case, an independent transmission path from the housing to the piston rod and/or the movement application component for preventing further rotation of the piston rod and/or the movement application component in the dispense rotational direction is established (closed) by the engagement of the second engagement means with the first engagement means at the end of dose dispense. The independent transmission path is independent from the kinematic chain of the driving mechanism. Accordingly, by the engagement of the second engagement means with the first engagement means, the additional transmission path can bypass not only the at least one intermediate component of the kinematic chain but even the dose dispense end stop for the dose setting unit. In this case, the rotational end stop mechanism is independent from the dose dispense end stop for the dose setting unit. However, most preferably, such an independent rotational end stop mechanism may be provided in addition to the dose dispense end stop. This exhibits a back-up function for the end of dose dispense. Furthermore, providing the dose dispense end stop in addition to the rotational end stop mechanism prevents that unwanted forces are applied to the driving mechanism and the rotational end stop mechanism if the user tries to dial the set dose down below zero during dose setting.

According to a preferred embodiment of the present disclosure, the dosing mechanism comprises a dispense knob. More preferably, the dispense knob is located at a proximal end of the dosing mechanism. Most preferably, the dispense knob is located at a proximal end of the dose setting unit. The dispense knob may be rotatable with respect to the dose setting unit. Additionally or alternatively, the dispense knob may be configured to be axially movable with a predetermined stroke with respect to the dose setting unit for dose dispense. Hence, the dispense knob is axially movable with respect to the dose setting unit between a proximal idle position and a distal dispense position. The dosing mechanism can include an elastic member for pressing the dispense knob in the proximal direction (towards the idle position), for example a spring washer or a coil spring. Hence, the user has to overcome an elastic force of the elastic member to start dose dispense. In more detail, this elastic force must be overcome by the user for pressing the dispense knob distally into the dispense position.

According to a further aspect, the dosing mechanism may comprise a clutch mechanism for rotationally coupling and decoupling the driving mechanism to the dose setting unit depending on whether the dispense knob is in its idle position or its dispense position. In one embodiment, the clutch mechanism rotationally couples the driving mechanism to the dose setting unit as long as the dispense knob is in the idle position, but rotationally decouples the driving mechanism from the dose setting unit as long as the dispense knob is in the dispense position. Additionally or alternatively, the clutch mechanism may rotationally couple at least a part of the driving mechanism (for example a drive sleeve) rotationally to the housing as long as the dispense knob is in the dispense position. In another embodiment, the clutch mechanism rotationally decouples the driving mechanism from the dose setting unit as long as the dispense knob is in the idle position, but rotationally couples the driving mechanism to the dose setting unit as long as the dispense knob is in the dispense position.

Preferably, the first engagement means may comprise or consist of at least one tooth. The at least one tooth of the first engagement means is also referred to as the at least one first tooth. Especially, the first engagement means may comprise or consist of at least two first teeth. The first tooth or the several first teeth may extend in the axial direction and/or a radial direction, respectively. The radial direction is perpendicular to the axial direction and a circumferential direction.

In terms of this disclosure, the term "tooth" also includes an indentation having a shape corresponding to a protruding tooth, hence a shape for receiving a corresponding, protruding tooth.

More preferably, the first engagement means comprise or consist of an annular ring of first teeth. Said ring is also referred to as "first teeth ring". This does not imply that there must be a further teeth ring in any case. Most preferably, a spacing of adjacent first teeth of the first teeth ring corresponds to one dosage unit. By this, the end of dose dispense is defined even more precisely.

Preferably, the first engagement means is axially displaceable with respect to the piston rod. More preferably, the first engagement means is axially fixed with respect to the housing. This ensures that the second engagement means can engage the first engagement means independently from the axial position of the piston rod with respect to the housing. This is of particular importance as the dosing mechanism is suitable for several dose dispense processes. The axial position of the piston rod at the end of dose dispense depends on how much dosage units had been dispensed before the current dispense process.

According to another preferred aspect, the dosing mechanism comprises a first engagement member, which is directly rotationally fixed to the piston rod and/or to the movement application component, wherein the first engagement member comprises the first engagement means. The first engagement member is free to rotate with respect to the housing when the second engagement means do not engage the first engagement means. This applies at least during dose dispense. The first engagement means can be formed integrally with the first engagement member.

More preferably, the piston rod is axially displaceable with respect to the first engagement member. In particular, the first engagement member may be splined to the piston rod to prevent relative rotation between the piston rod and the first engagement member (and hence the first engagement means). The first engagement member may be axially fixed with respect to the housing.

Different from the piston rod sleeve, the first engagement member may not transmit rotation from the driving mechanism to the piston rod and/or the movement application device during dose dispense. The first engagement member is not part of the driving mechanism. It is provided in addition to the driving mechanism. In particular, it may be provided in addition to the drive sleeve of the driving mechanism.

Most preferably, the first teeth ring is formed at a distal end of the first engagement member, for example at a distal end surface of the first engagement member. In this case, the first teeth ring may protrude out at or recess in said distal surface in the axial direction. According to another embodiment, the first teeth ring is located on an outer circumferential surface of the first engagement member. In this case, the first teeth may protrude out at or recess in the outer circumferential surface. Also in this case, the first teeth ring may be located at a distal end of the first engagement member.

According to another aspect, the first engagement member may comprise a central passage for inserting the piston rod. At least a part of a cross-sectional shape of the central passage in a plane perpendicular to the axial direction (also referred to as "perpendicular plane") may correspond to at least a part of a shape of the piston rod in the perpendicular plan such that the piston rod is rotationally fixed with respect to the first engagement member. In particular, the piston rod may comprise an axial groove at its outer surface and the first engagement member may comprise a notch means engaging said axial groove. Of course, the piston rod may comprise several axial grooves and the first engagement member may comprise several notch means. Additionally or alternatively, the piston rod may have at least one flattened side surface, wherein the shape of the central passage of the first engagement member is adapted to the flattened side such that the piston rod is guided within the first engagement member such that the piston rod cannot rotate with respect to the first engagement member but can axially move relative to the first engagement member.

According to still another more preferred embodiment, the at least one first tooth is formed on the piston rod sleeve. Most preferably, the at least one first tooth is formed integrally with the piston rod sleeve. According to a particularly preferred embodiment, the at least one first tooth is formed on a lateral arm, which protrudes radially outwardly from the piston rod sleeve. The at least one first tooth may be formed on a radial outer end of the lateral arm. Additionally or alternatively, the at least one first tooth is formed on a distal side of the arm. The at least first tooth may be formed integrally with the arm. Such implementations of the at least one first tooth are, for example, advantageous to be engaged by second engagement means which are provided on a distal end of the number sleeve (see below).

Additionally or alternatively, the second engagement means may comprise or consist of at least one tooth. The at least one tooth of the second engagement means is also referred to as the at least one lock tooth. Especially, the second engagement means may comprise or consist of at least two lock teeth. The lock tooth or the several lock teeth of the second engagement means may extend in the axial direction and/or the radial direction, respectively. Especially, the second engagement means may have a shape corresponding to a shape of the first engagement means. By this, reliable and controlled engagement of the second engagement means with the first engagement means at the end of dose dispense are ensured.

More preferably, the second engagement means comprise or consist of an annular ring of lock teeth. Said ring is also referred to as the lock teeth ring. This does not imply that there must be a further teeth ring in any case. For example, in one exemplary embodiment, the first engagement means consist of one first tooth or two first teeth, whereas the second engagement means consist of the lock teeth ring. Most preferably, a spacing of adjacent lock teeth of the lock teeth ring corresponds to one dosage unit. By this, the end of dose dispense is defined even more precisely.

According to an aspect of the present disclosure, the second engagement means is formed on the dose setting unit. In particular, the second engagement means may be formed on the number sleeve. For example, the second engagement means can be fixed to the number sleeve. Most preferably, the second engagement means is formed integrally with the number sleeve. Especially, the second engagement means can be formed on the distal end of the number sleeve.

According to another embodiment of the present disclosure, the second engagement means is located at a distal end of the drive sleeve. Especially, the second engagement means may be formed at a distal end surface of the drive sleeve, most preferably comprising or consisting of the lock teeth ring at the distal end surface of the drive sleeve as described before. The drive sleeve may be configured as described above, wherein it is prevented from rotation in the dispense rotational direction at least at the end of dose dispense. For example, the drive sleeve may be prevented from any rotation with regard to the housing as long as the dispense knob is in its dispense position.

Particularly preferred is the combination with a first engagement member as described above, wherein the first engagement means comprises or consists of the first teeth formed at the proximal end surface of the first engagement member. The drive sleeve moves distally during dose dispense (as explained above) but does not rotate, and it reaches its most distal position at the end of dose dispense. When the drive sleeve reaches its most distal position, the lock teeth ring comes into engagement with the first teeth ring. Even at the end of dose dispense, as long as the dispense knob is still in its dispense position, the drive sleeve is prevented from rotation. Consequently, the lock teeth ring is prevented from rotation as well. By this, finally the piston rod is prevented from rotation at the end of dose dispense.

According to another aspect, the shape of the teeth of the at least one first tooth and the shape of the at least one lock tooth are preferably configured such that rotation of the number sleeve and/or of the drive sleeve in the dose increase rotational direction is not prevented during dose setting. This may particularly apply if the lock teeth ring is formed on the number sleeve or the drive sleeve.

For example, each tooth may comprise two engagement surfaces. A second engagement surface of each tooth is inclined with a second inclination angle that is equal or less than a dose increase pitch angle, which corresponds to the pitch of the movement of the number sleeve and/or the drive sleeve with respect to the housing during dose increase, respectively. If the at least one lock tooth engages the at least one first tooth, their respective second engagement surfaces mutually face each other. Therefore, the number sleeve and/or the drive sleeve are not prevented from rotating in the dose increase rotational direction even if the second engagement means engage the first engagement means. In this case, the two mutually facing second engagement surfaces slide along each other if the two second inclination angles exactly correspond to the dose increase pitch angle. If the second inclination angle is smaller than the dose increase pitch angle for at least one of the mutually facing second engagement surfaces, said second engagement surfaces depart from each other as soon as the set dose is increased from zero. Thus, it is easily possible to start setting of a new dose after the end of dose dispense.

Additionally or alternatively, a first engagement surface of each tooth is inclined with a first inclination angle that is equal or less than a dose dispense pitch angle, which corresponds to a difference and/or ratio between the first pitch and the second pitch. This allows, that the at least one first tooth and the at least one lock tooth are not prevented from further relative movement during dose dispense until the end of dose dispense is reached.

The inclination angles are defined with respect to the perpendicular plane. The smaller angle with regard to perpendicular plane may be relevant, respectively.

According to still another preferred aspect of the present disclosure, the second engagement means is axially and/or rotationally fixed with respect to the housing. More preferably, the second engagement means is directly fixed to the housing. Most preferably, the second engagement means are formed integrally with the housing. In this case, the second engagement means is firmly locked to the housing and hence particularly reliable.

In another preferred embodiment, the dosing mechanism comprises a second engagement means insert. The second engagement means insert is directly rotationally and axially fixed to the housing and comprises the second engagement means.

More preferably, the second engagement means insert comprises at least substantially ring-shaped element that is directly fixed to the housing. At least one flexible arm (preferably at least two flexible arms) extends from the ring-shaped element in the proximal direction (towards the dose setting unit). The second engagement means is formed at the at least one flexible arm, for example at an inner side in the radial direction. Especially, each flexible arm may comprise at least one lock tooth. In the radial direction, the piston rod is located centrally.

According to a further aspect, at the end of dose dispense, each flexible arm is deflected radially inwardly. By this, the second engagement means engages the first engagement means. In other words, the proximal end of each flexible arm is deflected towards the piston rod at the end of dose dispense. In contrast, the flexible arm is not deflected inwardly during dose dispense.

For example, the drive sleeve is adapted for moving in the distal direction during dose dispense (as explained above) and to reach its most distal position at the end of dose dispense. Only when the drive sleeve is in its most distal position, the drive sleeve engages and bends the at least one flexible arm of the second engagement means insert such that the second engagement means engages the first engagement means. In more detail, an internal cone may be formed at a distal end of the drive sleeve, wherein said internal cone is adapted for engaging the at least one flexible arm only when the drive sleeve is its most distal position at such that the at least one flexible arm is deflected inwardly, thereby urging the second engagement means into engagement with the first engagement means.

In another embodiment, the number sleeve is adapted for moving in the distal direction during dose dispense (as explained above) and to reach its most distal position at the end of dose dispense. Only when the number sleeve is in its most distal position, the number sleeve engages and bends the at least one flexible arm of the second engagement means insert such that the second engagement means engages the first engagement means. In more detail, an internal cone may be formed at a distal end of the number sleeve, wherein said internal cone of the number sleeve is adapted for engaging the at least one flexible arm only when the number sleeve is its most distal position such that the at least one flexible arm is deflected inwardly, thereby urging the second engagement means into engagement with the first engagement means.

In more general, the driving mechanism and/or the dose setting unit (more preferably, the drive sleeve and/or the number sleeve) may be configured to bring the second engagement means into engagement with the first engagement means at the end of dose dispense. For this, the drive sleeve and/or the number sleeve may directly engage the at least one flexible arm of the second engagement insert, for example.

Preferably, the dosing mechanism comprises visual indication means for indicating the set dose. More preferably, the visual indication means comprise visual indications which are provided on an outer surface of the number sleeve. The dosing mechanism may be configured such that different visual indications are visible depending on the position of the number sleeve and hence depending on the set dose. Hence, the user can see which dose is set. The housing may comprise a window or hole for only revealing the visual indication in the window or hole, which corresponds to the actual set dose.

The dosing mechanism may comprise a dose increase clicker means, which provides audible feedback for dose increase during dose setting. In particular, the dose increase clicker means may generate one audible click sound whenever the set dose is increased by one dosage unit.

Additionally or alternatively, the dosing mechanism may comprise a dose decrease clicker means, which provides audible feedback for dose decrease during dose setting. In particular, the dose decrease clicker means may generate one audible click sound whenever the set dose is decreased by one dosage unit.

Preferably, the dosing mechanism comprises a dispense clicker means, which provide audible feedback for dose dispense. In particular, the dispense clicker means may generate one audible click sound for each dosage unit that is dispensed.

The mentioned object is further solved by a drug delivery device for selecting and dispensing a number of user-variable doses of a medicament, wherein the drug delivery device comprises the dosing mechanism according to any one of the embodiments described. In particular, the drug delivery device may be a disposable or a pen-type drug delivery device.

Preferably, the drug delivery device comprises a cartridge housing. Most preferably, the cartridge housing accommodates a cartridge containing the medicament.

The injection device typically comprises a cartridge containing a medicament.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrome.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present disclosure include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present disclosure, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

BRIEF DESCRIPTION OF THE FIGURES

Non-limiting, exemplary embodiments of the present disclosure will now be described with reference to the accompanying drawings, in which.

DETAILED DESCRIPTION

Figure 1:
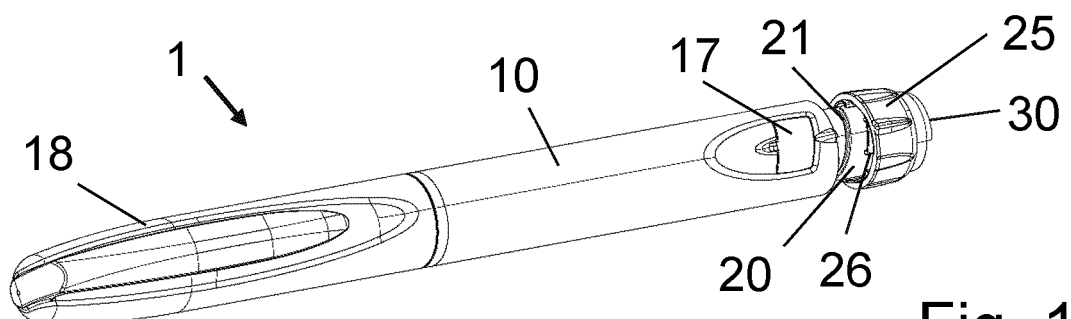
FIG. 1 is a perspective view of a pen-type drug delivery device comprising a first embodiment of a dosing mechanism according to the present disclosure.

FIG. 1 shows a first embodiment of a pen-type drug delivery device 1 according to the present disclosure comprising a housing 10. The drug delivery device 1 is configured for selecting and dispensing a number of user-variable doses of a medicament. The drug delivery device 1 according to this embodiment is a disposable device.

Figure 2:
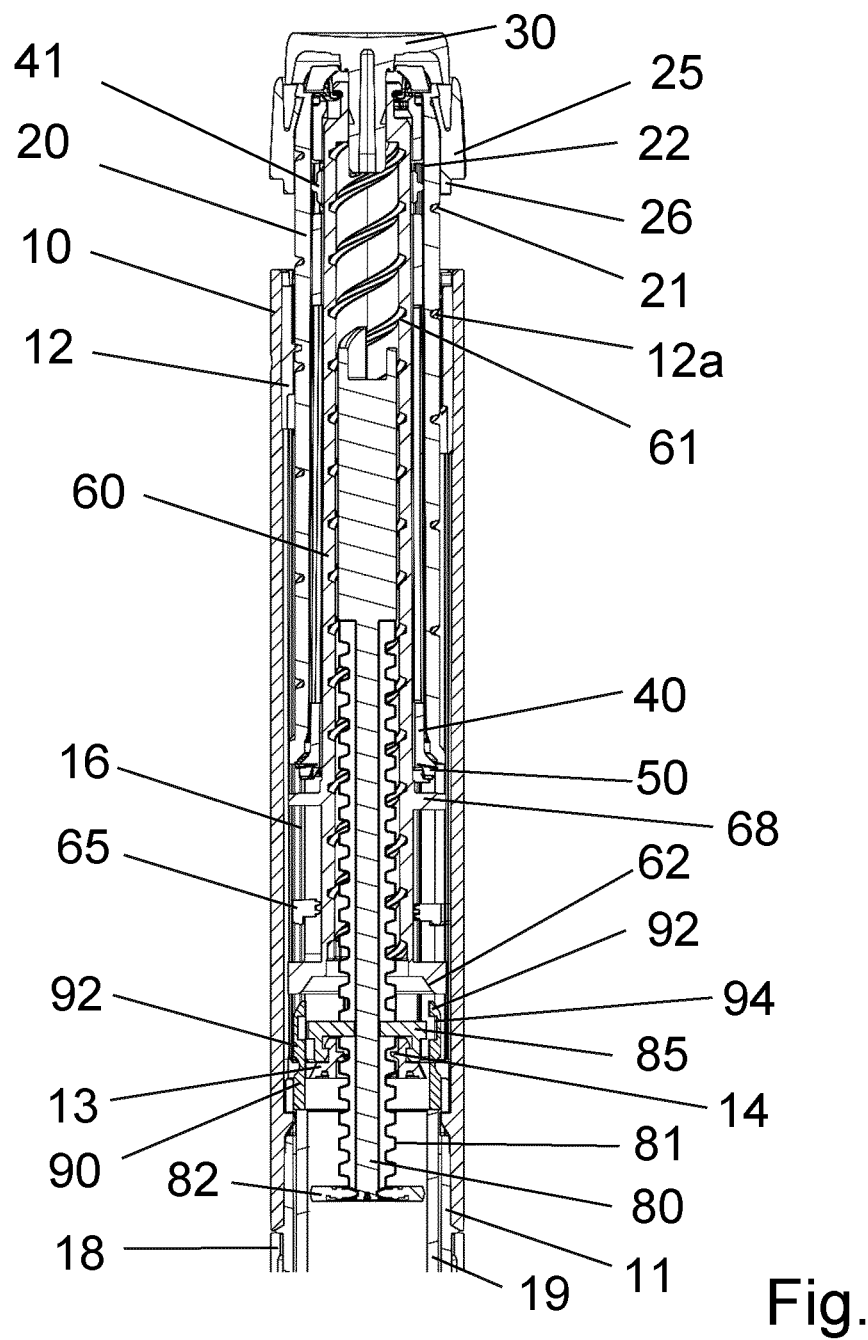
FIG. 2 is a cross-sectional side view of a dosing section of the pen-type drug delivery device of FIG. 1 with the first embodiment of the dosing mechanism in a state, in which a dose is set.
Figure 3:
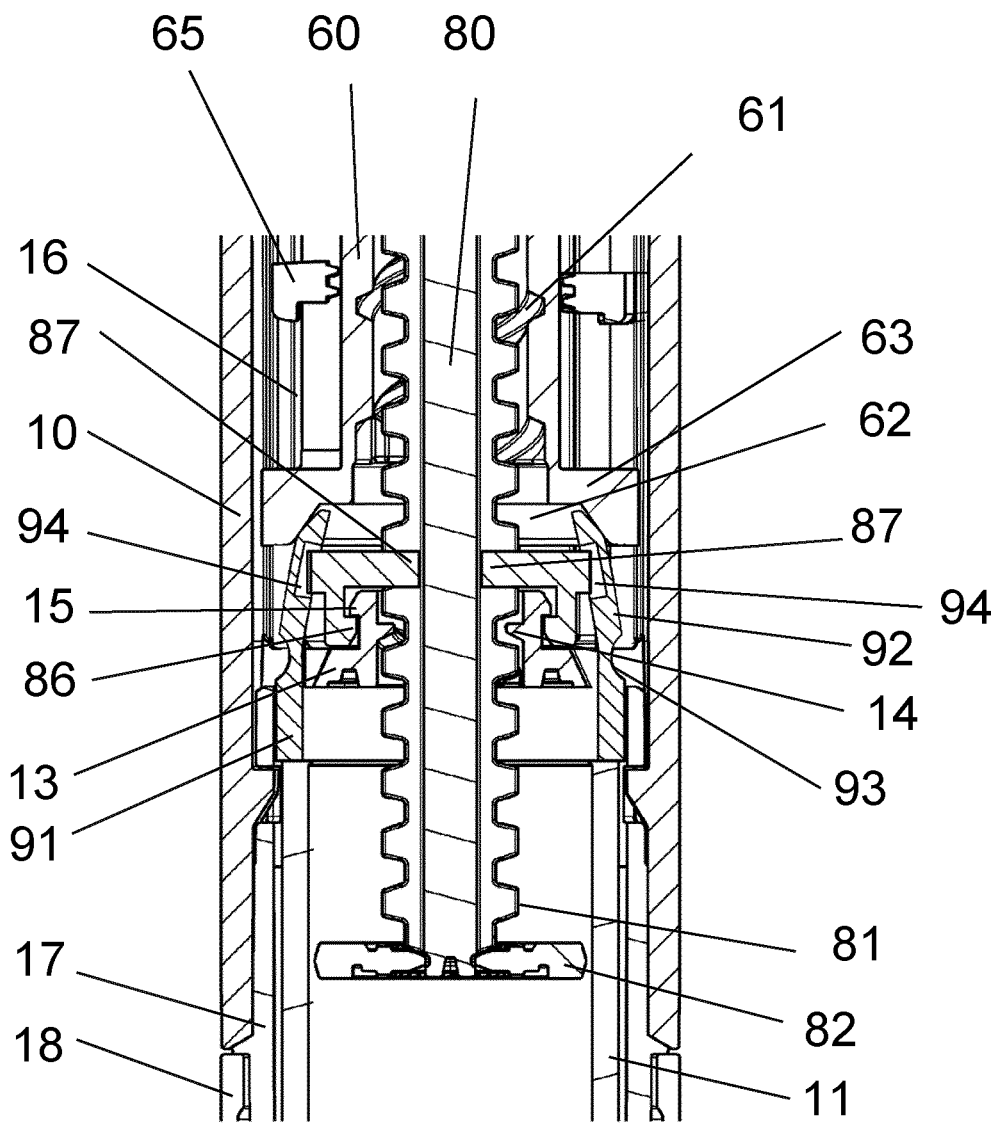
FIG. 3 is an enlarged cross-sectional side view of a section of the dosing mechanism of FIG. 2 including a rotational end stop mechanism at the end of dose dispense.

A cartridge holder 11 is fixed to a distal side of the housing 10 (see FIGS. 2 and 3). A cartridge 19 is accommodated in an interior of the cartridge holder 11. The cartridge 19 contains the medicament. Furthermore, a pen cap 18 is detachably mounted on the cartridge holder 11. In FIG. 1, the pen cap 18 covers a cartridge section of the drug delivery device with the cartridge holder 11 and the cartridge 19.

The drug delivery device 1 comprises a first embodiment of a dosing mechanism according to the present disclosure. The housing 10 may be regarded as a part of the dosing mechanism. The housing 10 has a substantially sleeve-like shape extending along an axial direction. The dosing mechanism further comprises a dose setting unit, a drive mechanism, and a piston rod 80.

The dose setting unit comprises a number sleeve 20 and a dose setting ring 25. The dose setting ring 25 fixed to a proximal end of the number sleeve 20. It is rotationally and axially fixed to the number sleeve 20. On a radially outer surface of the number sleeve 20, helical grooves are formed. The helical grooves constitute an outer thread 21 of the number sleeve 20. At a proximal end of the housing 10, an insert 12 is provided. The insert 12 is axially and rotationally fixed to the housing 10 and is considered part of the housing 10. On a radially inner side, the insert 12 comprises an inner thread 12a engaging the outer thread 21 of the number sleeve 20. Hence, finally, the number sleeve 20 is threadedly engaged with the housing 10.

Figure 11:
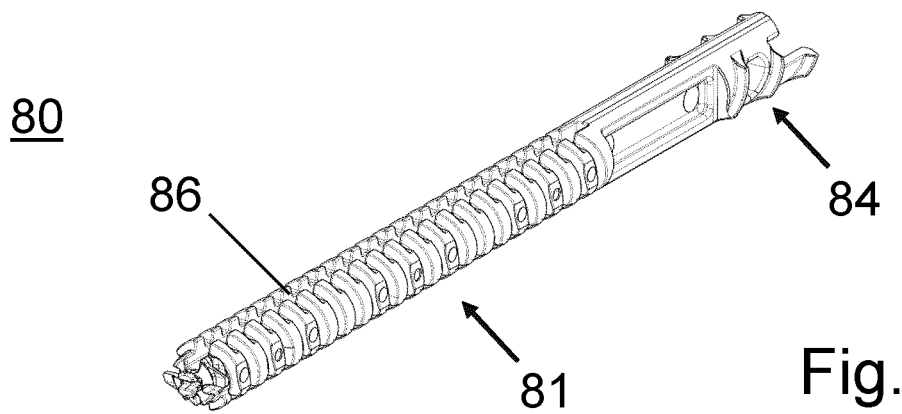
FIG. 11 is a perspective view of a piston rod that is used in the first embodiment and the second embodiment of the dosing mechanism, wherein the piston rod comprises a first outer thread with a first pitch on a distal side and second outer thread with a larger, second pitch at a proximal side.

The piston rod 80 is shown in FIG. 11. It is the same for the first embodiment and a second embodiment of the dosing mechanism. The piston rod 80 comprises a first outer thread 81 with a first pitch on a distal side and a second outer thread 84 with a second pitch on a proximal side. The distal side of the piston rod 80 with the first outer thread 81 is inserted in and engaged with an inner thread 14 of a transversal wall 13 of the housing 10. Hence, the piston rod 80 is threadedly engaged with the housing 10 with the first pitch. A pressing foot 82 is axially but rotatably fixed to a distal end of the piston rod 80. The pressing foot 82 is adapted to apply a distal movement of the piston rod 80 during dose dispense on a bung of the cartridge 19 in order to enforce the ejection of medicament out of the cartridge 19.

The driving mechanism comprises a clutch sleeve 40, a spring washer 50, and a drive sleeve 60. The drive sleeve 60 is axially fixed with respect to the dose setting unit. An inner thread 61 of the drive sleeve 60 is engaged with the second outer thread 84 of the piston rod 80. Hence, the drive sleeve 60 is threadedly engaged with the piston rod 80 with the second pitch. A proximal portion of the drive sleeve 60 is inserted into an interior of the clutch sleeve 40 and rotationally fixed to the latter. The clutch sleeve 40 is axially movable with respect to the drive sleeve 60 with a predetermined stroke. The spring washer 50 is provided between a proximal side of a proximal flange 68 of the drive sleeve 60 and a distal end surface of the clutch sleeve 40. The spring washer 50 exhibits an elastic force that urges the clutch sleeve 40 in the proximal direction with respect to the drive sleeve 60. The spring washer 50 is rotationally fixed but axially movable with respect to the housing 10. In this embodiment, the spring washer 50 comprises substantially flat but corrugated main ring washer and two arms (not shown) that extend radially outward, respectively, at opposite lateral sides of the main ring washer. Each of the arms is guided in a corresponding axial groove formed at an inner surface of the housing 10. Therefore, the spring washer 50 is axially movable with respect to the housing 10 but not rotatable with respect to the housing 10. Furthermore, on a proximal side of the spring washer 50, two protrusions extending in the proximal direction (not shown) are formed. These protrusions engage an annular dispense lock teeth ring, which is formed at the distal end surface of the clutch sleeve 40.

A dispense knob 30 is mounted within the dose setting ring 25. The dispense knob 30 is rotatable with respect to the dose setting unit and is movable with a predetermined stroke with respect to the dose setting unit. However, the dispense knob 30 abuts on the clutch sleeve 40 in the distal direction. Hence, the spring washer 50 urges the dispense knob 30 (via the clutch sleeve 40) to a proximal idle position. The user has to press the dispense knob 30 in the distal direction for performing dose dispense.

If the user presses the dispense knob 30 in the distal direction against the elastic force of the spring washer 50, the dispense knob 30 and the clutch sleeve 40 move in the distal direction with respect to the dose setting unit and the drive sleeve 60. Hence, the dispense knob 30 and the clutch sleeve 40 are held in a distal dispense position, respectively, as long as the user presses the dispense knob 30. Therefore, the elastic force of the spring washer 50 urges the protrusions thereof into firm engagement with the dispense lock teeth ring at the distal end surface of the clutch sleeve 40. The protrusions cannot slider over the dispense lock teeth ring when the clutch sleeve 40 is in its distal dispense position. Consequently, the clutch sleeve 40 is prevented from rotating with respect to the housing 10 during dose dispense and even at the end of dose dispense. It should be noted that the user ends pressing the dispense knob 30 at least a short time after the end of dose dispense.

The dose setting unit is rotatable to set a dose. The user can increase a set dose by rotating the dose setting ring 25 in a dose increase rotational direction with respect to the housing 10. As the dose setting ring 25 is fixed to the number sleeve 20, the number sleeve 20 also rotates in the dose increase rotational direction with respect to the housing 10. Due to the threaded engagement of the number sleeve 20 with the housing 10, the entire dose setting unit helically winds out of the housing 10 in a proximal direction when it is rotated in the dose increase rotational direction. Accordingly, the user can decrease the set dose by rotating the dose setting ring 25 in a dose decrease rotational direction, which is opposite to the dose increase rotational direction. In this case, the entire dose setting unit helically winds back into the housing 10 in a distal direction. The proximal direction and the distal direction are both parallel to the axial direction, wherein the distal direction is opposite to proximal direction. In this example, the dose increase rotational direction is clockwise when looking along the distal direction.

Furthermore, visual indications relating to the set dose are provided on the radially outer surface of the number sleeve 20. For example, numerals for indicating the dosage units of the set dose may be printed on the outer surface of the number sleeve 20. The housing 10 comprises an opening or window 17 for revealing the visual indication of the number sleeve 20 corresponding to the actually set dose. Only the visual indication (for example, the numerals corresponding to the dosage units of the set dose) corresponding to the actually set dose are revealed by the window 17. In this example, the window 17 is located at the distal end of the housing 10.

When the clutch sleeve 40 is in its proximal idle position, the protrusions of the spring washer 50 can slide over the dispense lock teeth ring of the clutch sleeve 40. This happens during dose setting when the dose setting unit is rotated by the user. In more detail, a rotational distance between two adjacent teeth of the dispense lock teeth ring corresponds to one dosage unit, respectively. Hence, an audible click and a haptic feedback is generated whenever the set dose is increased or decreased by one dosage unit during dose setting.

Furthermore, when the clutch sleeve 40 is in its proximal idle position, dose setting lock teeth on the proximal side of the clutch sleeve 40 are engaged with corresponding dose setting lock teeth formed on an inward flange at the proximal side of the number sleeve 20. In other words, the clutch sleeve 40 and hence the drive sleeve 60 are rotationally fixed to the number sleeve 20 during dose setting. Therefore, the clutch sleeve 40 and hence the drive sleeve 60 follow the rotation of the dose setting unit during dose setting unit. Furthermore, as noted above, the drive sleeve 60 is axially fixed with respect to the dose setting. Accordingly, the second pitch and a pitch of the threaded engagement between the number sleeve 20 and the housing 10 are identical, and the drive sleeve 60 helically climbs up the piston rod 80 in the proximal direction when the set dose is increased during dose setting. Vice versa, if the set dose is decrease during dose setting, the drive sleeve 60 helically climbs down the piston rod 80 in the distal direction. The piston rod 80 does neither rotate nor move in the axial direction with respect to the housing 10 during dose setting.

In contrast, the dose setting lock teeth of the clutch sleeve 40 are disengaged from the dose setting lock teeth of the number sleeve 20 when the clutch sleeve 40 is in its distal dispense position. Consequently, the clutch sleeve 40 and the drive sleeve 60 are rotatable with respect to the number sleeve 20 in this case, in particular during dose dispense. However, in this state, they are both rotationally fixed with respect to the housing 10.

Hence (due to the interactions of the housing 10, the dose setting unit, the dispense knob 30, the clutch sleeve 40, the spring washer 50, and the drive sleeve 60), the dosing mechanism includes a clutch mechanism for rotationally coupling and decoupling the driving mechanism and the dose setting unit.

As noted before, for dose dispense, the user presses the dispense knob 30 distally. Then, the drive sleeve 60 is rotationally fixed to the housing 10 via the clutch sleeve 40 and the spring washer 50. If the user continues pressing the dispense knob 30 in the distal direction, the entire dose setting unit winds back into the housing 10 and dose dispense starts. As the drive sleeve 60 is axially fixed with respect to the dose setting unit, the clutch sleeve 60 also moves in the distal direction during dose dispense. Due to the threaded engagement between the drive sleeve 60 and the piston rod 80 with the second pitch, the piston rod 80 is rotated in a dispense rotational direction with respect to the housing 10 during dose dispense. In this embodiment, the dispense rotational direction corresponds to the dose increase rotational direction. Due to the threaded engagement between the piston rod 80 and the housing 10 with the first pitch, the piston rod 80 is also advanced in the distal direction. As the first pitch is considerably smaller than the second pitch, a reduction mechanism is exhibited. A total distal movement of the piston rod 80 during dose dispense is proportional to a total distal movement of the dose setting unit during dose dispense multiplied by a reduction factor R. The factor R is more than zero but less one ($0<R<1$), preferably between 0.25 and 0.8. Accordingly, a force necessary for dose dispense is decreased by the reduction mechanism.

The dosing mechanism comprises a dose dispense end stop for the dose setting unit for terminating the helical distal movement of the dose setting unit with regard to the housing 10 at the end of dose dispense. More specifically, rotational stop means 26 are formed at a distal side of the dose setting ring 25. At the end of dose dispense, the rotational stop means 26 abut corresponding rotational stop means (not shown) formed on the insert 12 of the housing 10. As the distal movement of the number sleeve 20 is transmitted by the driving mechanism during dose dispense for rotating the piston rod 80 (in order to finally advance the piston rod 80 due to its threaded engagement with the housing 10), dose dispense is stopped as soon as the helical distal movement of the number sleeve 20 is stopped by the dose dispense end stop.

In addition, the first embodiment of the dosing mechanism comprises a rotational end stop mechanism for terminating dose dispense, in particular for preventing the piston rod 80 from further rotation in the dispense rotational direction at the end of dose dispense more directly and more accurate.

Figure 8:
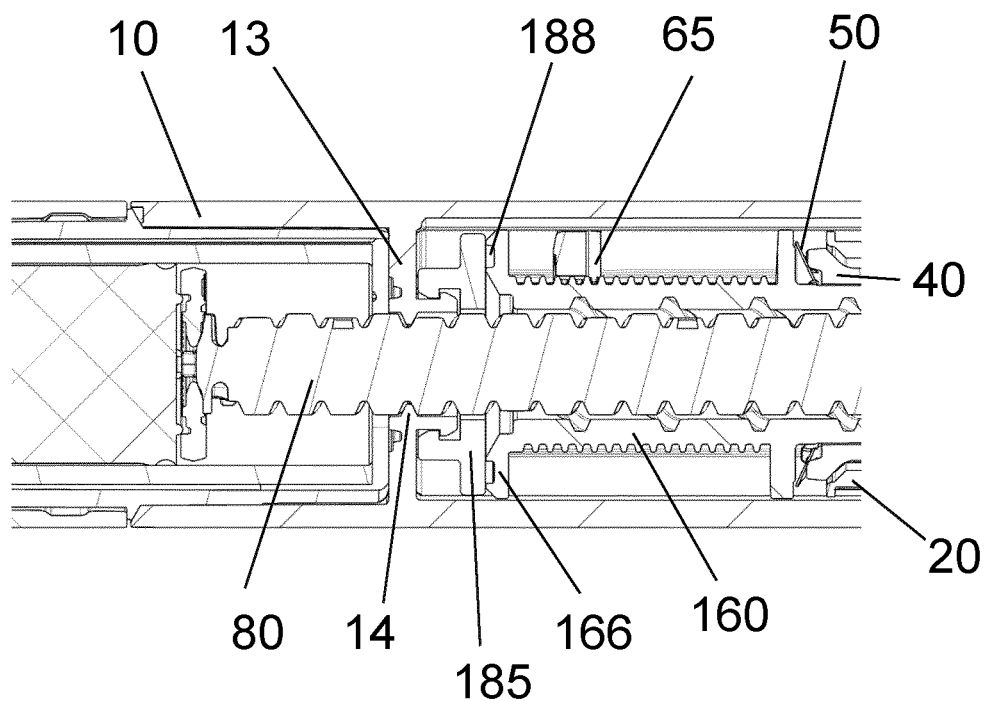
FIG. 8 shows the section of FIG. 7 at the end of dose dispense when the second engagement means are engaged with the first engagement means.

The rotational end stop mechanism of the first embodiment comprises a first engagement member 85 (see FIG. 8). The first engagement member 85 has a basically disk-like shape. It includes a central passage 89 for inserting the distal part of the piston rod 80. Two notch means 87 protrude radially inwardly into the central passage 89. The notch means 87 engage corresponding axial grooves 86 formed at the distal side on the piston rod 80 (see FIG. 11). Thus, the first engagement member 85 is splined to the piston rod 80. The piston rod 80 is prevented from rotation with respect to the first engagement member 85 but is axially movable with respect to the latter. An annular first teeth ring 88 is integrally formed with the first engagement member 85 at a outer circumferential surface of the latter, in more detail on a proximal end of said outer circumferential surface.

In this embodiment, the first teeth ring 88 constitutes a first engagement means in terms of the present disclosure.

The first engagement member 85 is axially fixed to the housing 10 but rotatable with respect to the latter. In more detail, the first engagement member 85 is directly axially fixed to the transversal wall 13 of the housing 10 by snap-in means 15, 86. The transversal wall 13 is formed integrally with the housing 10 in this embodiment. In a modification, the transversal wall 13 can be an insert which is directly rotationally and axially fixed to the housing 10.

Figure 4:
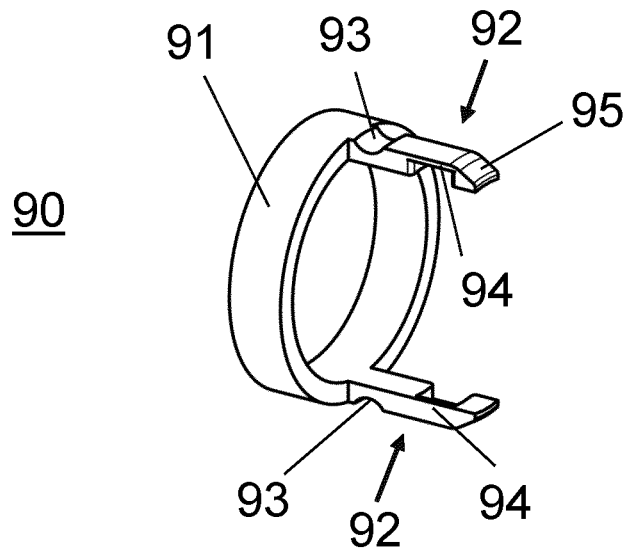
FIG. 4 is a perspective view of a second engagement means insert of the dosing mechanism of FIG. 2 with two flexible arms, wherein the second engagement means of the rotational end stop mechanism is formed on the flexible arms.
Figure 5:
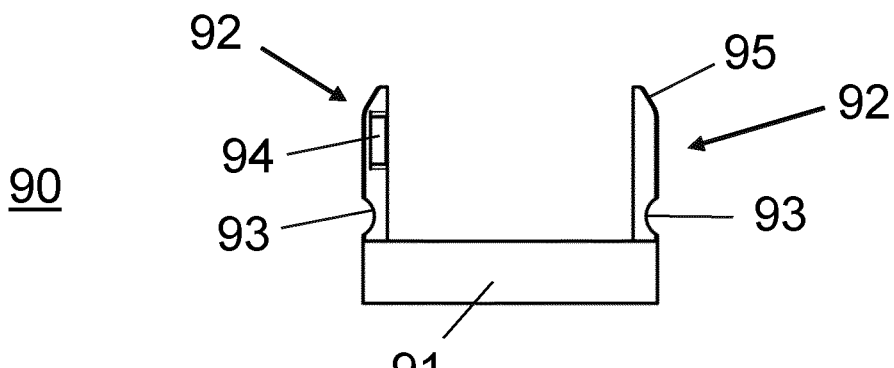
FIG. 5 is a side view of the second engagement means insert of FIG. 4.
Figure 6:
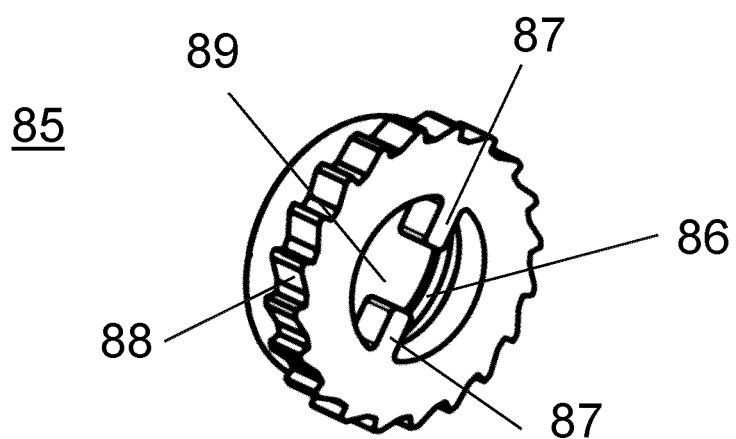
FIG. 6 is a perspective view of a first engagement member of the dosing mechanism of FIG. 2, wherein the first engagement member has a substantially disc-like shape, wherein an annular first teeth ring is formed on an circumferential surface of the first engagement member, wherein the first teeth ring constitutes a first engagement means of the rotational end stop mechanism.

Furthermore, the rotational end stop mechanism includes a second engagement means insert 90 (see FIGS. 4 and 5). The second engagement means insert 90 comprise a ring-shaped element 91, which is directly axially and rotationally fixed to the housing 10. Two flexible arms 92 extend from the ring-shaped element 91 in the proximal direction. Near to a distal end of each flexible arm 92 (i.e. near to the connection to the ring-shaped element 91), a recess 93 is formed. Hence, a force necessary for bending proximal tip portions of the flexible arms 92 is reduced. Furthermore, the bending of the flexible arms 92 is defined more precisely, if the recesses 93 are provided.

At each flexible arm 92, next to the proximal tip portion, a single lock tooth 94 is integrally formed, respectively. The lock teeth 94 of the opposite flexible arms 92 are facing each other. In other words, the lock teeth 94 are formed on an inner side of the respective flexible arm 92 in the radial direction. A shape of the lock teeth 94 corresponds to a shape of the teeth of the first teeth ring 88. For each flexible arm 92, an outer side of the flexible arm 92 in the radial direction is tapered at the proximal tip portion. Hence, a tapered surface 95 is formed at the tip portion. Preferably, the shape of the tapered surfaces 95 corresponds at least substantially to a shape of an internal cone 62 that is formed at a distal end surface of the drive sleeve 60.

In this embodiment, the lock teeth 94 constitute second engagement means in terms of the present disclosure. As the second engagement means insert 90 is directly rotationally and axially fixed to the housing 10, the same applies with regard to the lock teeth 94, which are formed integrally with the second engagement means insert 90. However, the lock teeth 94 are displaced minimally in the distal direction when the corresponding flexible arms 92 are deflected radially inwardly. Furthermore, the lock teeth 94 are displaceable in the radial direction perpendicular to the axial direction.

In more general, the second engagement means may be displaceable in the axial and/or the radial direction for coming into engagement with the first engagement means.

The first engagement member 85 is located between the two flexible arms 92. Each of the lock teeth 94 faces the first teeth ring 88 (see FIGS. 2 and 3).

As noted above, an internal cone 62 is formed at the distal end surface of the drive sleeve 60. In more detail, the internal cone 62 is formed at a distal side of a distal flange 63 of the drive sleeve 60, wherein the distal flange 63 constitutes a distal end of the drive sleeve 60. The internal cone 62 is adapted for engaging the second engagement means with the first engagement means when it is in its most distal position. This is described in more detail in the following.

FIG. 2 shows the dosing mechanism according to the first embodiment in a state when a dose is set. However, dose dispense has not yet started as the dispense knob 30 is still in its proximal idle position. The number sleeve 20 is partly wound out of the housing in the proximal direction and the dosing mechanism exhibits a dial extension. The dose setting ring 25, the dispense knob 30, the clutch sleeve 40, the spring washer 50, and the drive sleeve 60 are displaced together with the number sleeve 20 in the proximal direction compared to a state when no dose is set. Accordingly, the drive sleeve 60 is displaced from its most distal position towards the proximal direction. In this state, the internal cone 62 is displaced away from the flexible arms 92 and it does not engage the flexible arms 92. The flexible arms 92 are not deflected and the lock teeth 94 are not engaged with the first teeth ring 88. Consequently, the first engagement member 85 and the piston rod 80 are not prevented from rotation with respect to the housing 10 by the lock teeth (second engagement means) 94. In this meaning, the first engagement member 85 and the piston rod 80 are free to rotate with respect to the housing 10.

During dose dispense, the drive sleeve 60 travels in the distal direction. However, as long as the drive sleeve 60 has not reached its most distal position at the end of dose dispense, the lock teeth 94 remain disengaged from the first teeth ring 88. As noted above, it is even necessary that the piston rod 80 rotates in the dispense rotational direction during dose dispense.

FIG. 3 shows the state at the end of dose dispense. The drive sleeve 60 is in its most distal position and engages the flexible arms 92. In particular, the internal cone 62 abuts the tapered surfaces 95 of the flexible arms 92. The internal cone 62 urges the tip portions of the flexible arms 92 radially inwardly such that the lock teeth 94 engage the first teeth ring 88. Consequently, the first engagement member 85 and hence the piston rod 80 splined thereto are prevented from rotation with respect to the housing 10, especially from further rotation in the dispense rotational direction. By this, the rotational end stop mechanism ensures controlled, precisely defined, and reliable end of dose dispense.

Preferably, a distance between two adjacent first teeth of the first teeth ring 88 corresponds exactly to one dosage unit, respectively. In other words, the spacing of adjacent teeth of the first teeth ring 88 corresponds to one dosage unit. This means that exactly one more dosage unit is expelled during dose dispense when the same lock tooth 94 engages the adjacent next first tooth instead of an actual first tooth.

Figure 7:
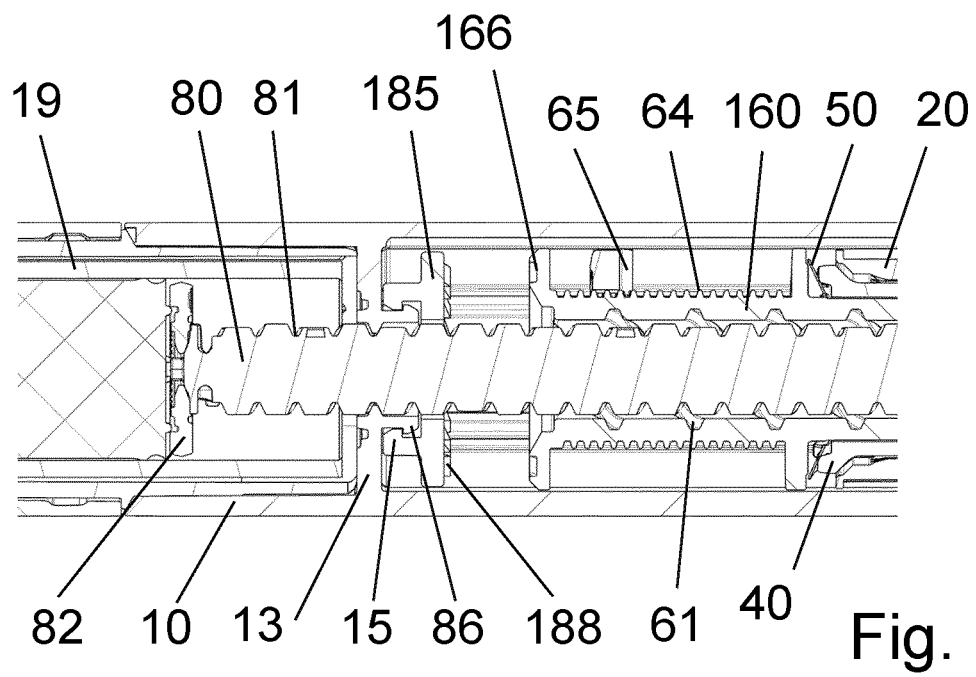
FIG. 7 is a cross-sectional side view showing a section of a second embodiment of a dosing mechanism according to the present disclosure during dose dispense when a second engagement means is decoupled from a first engagement means.
Figure 9:
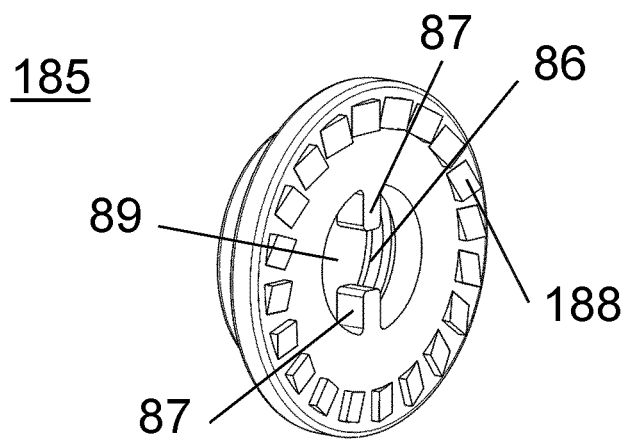
FIG. 9 is a perspective view of a first engagement member of the dosing mechanism of FIG. 7 having a substantially disc-like shape, wherein an annular first teeth ring is formed on a proximal end surface of the first engagement member, wherein the first teeth ring constitutes the first engagement means of a rotational end stop mechanism of the second embodiment.
Figure 10:
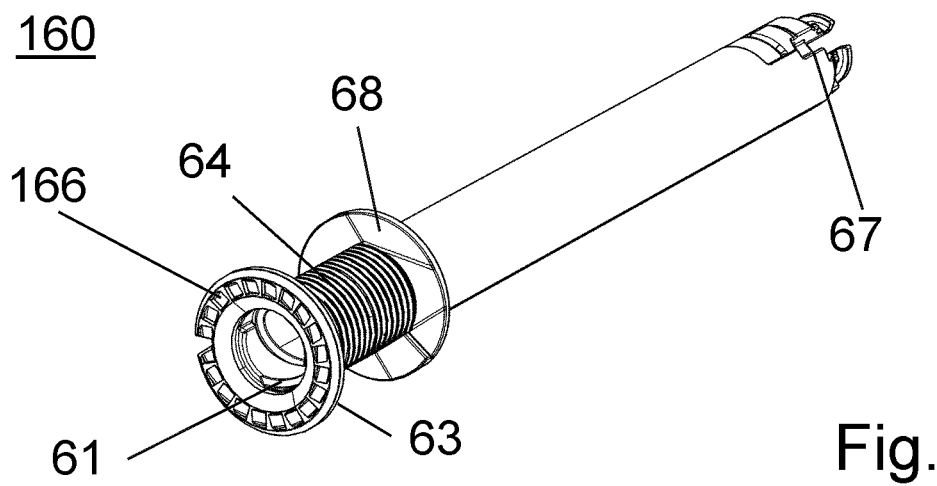
FIG. 10 is a perspective view of a drive sleeve of the dosing mechanism of FIG. 7, wherein an annular lock teeth ring, which consist of indentations corresponding to the first teeth ring of the first engagement member according to FIG. 9, is formed on a distal end surface of the drive sleeve.

FIGS. 7 to 9 relate to a second embodiment of a dosing mechanism according to the present disclosure. Unless otherwise specified, the second embodiment is identical to the first embodiment and is not described again. The same reference signs as used with regard to the first embodiment will be used for identical parts.

The second embodiment differs from the first embodiment only regarding the rotational end stop mechanism. In particular, the second embodiment of the dosing mechanism can be used in the drug delivery device 1 instead of the first embodiment without additional modifications.

In the second embodiment, the rotational end stop mechanism includes a first engagement member 185 (see FIG. 9) as well. Again, the first engagement member 185 has a basically disk-like shape and includes the central passage 89 for inserting the distal part of the piston rod 80.

Different from the first embodiment, an annular first teeth ring 188 is integrally formed with the first engagement member 185 at a proximal end surface of the latter. In more detail, the annular first teeth ring 188 is formed on a radially outer portion of the proximal end surface of the first engagement member 185 in this case.

In the second embodiment, the first teeth ring 188 constitutes the first engagement means in terms of the present disclosure.

Furthermore, in this second embodiment, a corresponding annular lock teeth ring 166 is formed at a distal end surface of a drive sleeve 160 instead of the internal cone 62. Apart from this, the drive sleeve 160 is identical with the drive sleeve 60 of the first embodiment. In more detail, the lock teeth ring 166 consists of indentations corresponding to the protruding teeth of the first teeth ring 188. The lock teeth ring 166 is adapted for engaging the first teeth ring 188 at the end of dose dispense. Seen in the axial direction, the lock teeth ring 166 and the first teeth ring 188 face each other.

FIG. 7 shows the rotational end stop mechanism of the second embodiment during dose dispense. As described above with regard to the first embodiment, the dispense knob 30 is pressed by the user and hence is in its distal dispense position. This dispense knob 30 urges the clutch sleeve 40 against the elastic force of the spring washer 50 towards the proximal flange 68 of the drive sleeve 160 in the distal dispense position. Thereby, the spring washer 50 is compressed between the proximal side of the proximal flange 68 of the drive sleeve 160 and the distal end surface of the clutch sleeve 40 with the dispense lock teeth ring. Hence, the clutch sleeve 40 and the drive sleeve 160 are prevented from rotation with respect to the housing 10 via the spring washer 50. During dose dispense, the clutch sleeve 40, the spring washer 50 and the drive sleeve 160 together move in the distal position but do not rotate. As long as the drive sleeve 160 has not reached its most distal position at the end of dose dispense, the lock teeth ring 166 remains disengaged from the first teeth ring 188. Consequently, the first engagement member 185 and the piston rod 80 are not prevented from rotation with respect to the housing 10 by the lock teeth ring 166 during dose dispense.

FIG. 8 shows the rotational end stop mechanism of the second embodiment at the end of dose dispense. The drive sleeve 160 has reached its most distal position. The lock teeth ring 166 engages the first teeth ring 188. As the dispense knob 30 is still pressed and is still in its distal dispense state even after the end of dose dispense for at least a short time, the drive sleeve 160 is still prevented from rotation with respect to the housing 10 at the end of dose dispense via the clutch sleeve 40 and the spring washer 50. Consequently, the first engagement member 185 and hence the piston rod 80 splined thereto are prevented from further rotation in the dispense rotational direction with respect to the housing 10 at the end of dose dispense.

The shapes of the lock teeth ring 166 and the first teeth ring 188 are configured such that the lock teeth ring 166 can approach the first teeth ring 188 unhindered during dose dispense until the drive sleeve 160 has reached its most distal position at the dose dispense. Furthermore, the shapes of the lock teeth ring 166 and the first teeth ring 188 are configured such that new dose setting is not impaired after the end of dose dispense. In more detail, the shapes of the lock teeth ring 166 and the first teeth ring 188 are configured such that a distal helical movement of the dive sleeve 160 including a rotation in the dose increase rotational direction with respect to the housing is not prevented (or even impaired) even when the drive sleeve 160 is in its most distal position (i.e. at the end of dose dispense and after the end of dose dispense). This is explained in more detail with regard to FIG. 12A to 12D in the following. These figures schematically show the relative movement between the first teeth ring 188 and the lock teeth ring 166 from shortly before the end of dose dispense (see FIG. 12A) until a new set dose is increased after the end of dose dispense (see FIG. 12D).

Figure 12A:
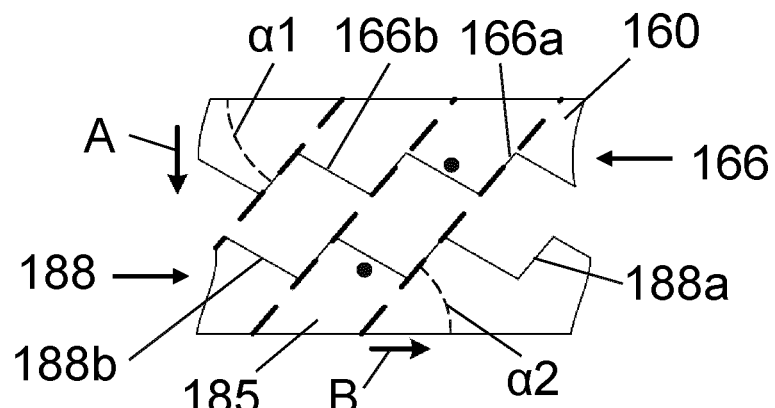
FIG. 12A to 12D schematically show the relative movement between the first teeth ring and the lock teeth ring of the second embodiment from shortly before the end of dose dispense until a new dose is set after the end of dose dispense.

FIG. 12A schematically shows a state during dose dispense. During dose dispense, the drive sleeve 160 with the lock teeth ring moves in the distal direction without rotation with respect to the housing 10. This is indicated by an arrow A. The first engagement member 185 rotates in the dispense rotational direction but does not move axially with respect to the housing 10. This is indicated by an arrow B. In total, the lock teeth ring 166 moves according to a helical movement with respect to the first teeth ring 185 during dose dispense. This helical movement has an effective pitch that depends on the difference between the first pitch and the second pitch. In other words, the effective pitch is related to the reduction factor R. A dose dispense pitch angle α corresponds to this effective pitch. The dose dispense pitch angle α is defined as the smaller angle between a trajectory of said helical movement with regard to the perpendicular plane. The perpendicular plane corresponds to the horizontal direction in FIG. 12A to 12D. The dose dispense pitch angle α is not explicitly indicated in the figures.

Figure 12B:
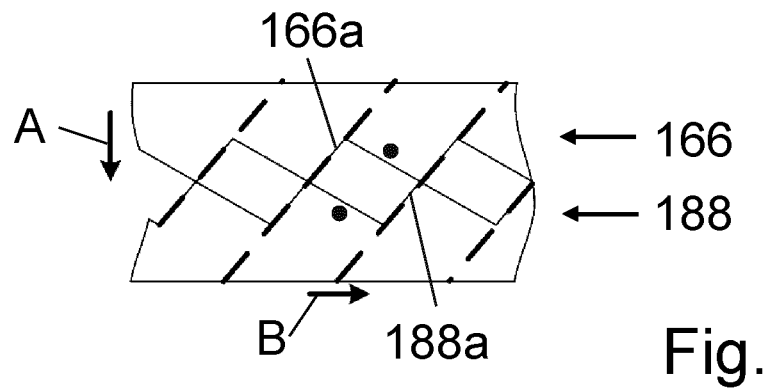

In FIG. 12B, the drive sleeve 160 has moved further in the distal direction and has almost reached its most distal position. However, in FIG. 12B, dose dispense continues and hence the helical movement between the drive sleeve 160 and the first engagement member 185 (see arrows A and B in FIG. 12B) with the dose dispense pitch angle α (not shown) continues.

Figure 12C:
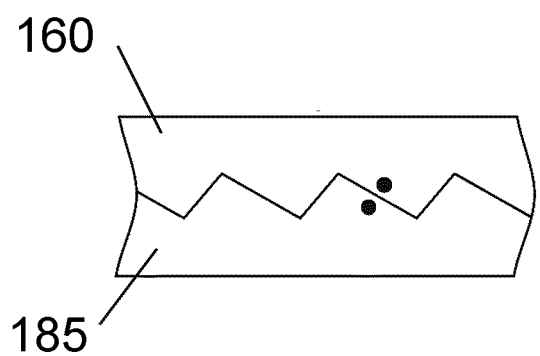

FIG. 12C schematically shows a state at the end of dose dispense. The drive sleeve 160 has reached its most distal position. Neither the drive sleeve 160 nor the first engagement means 185 move. The lock teeth ring 166 engages the first teeth ring 188.

Figure 12D:
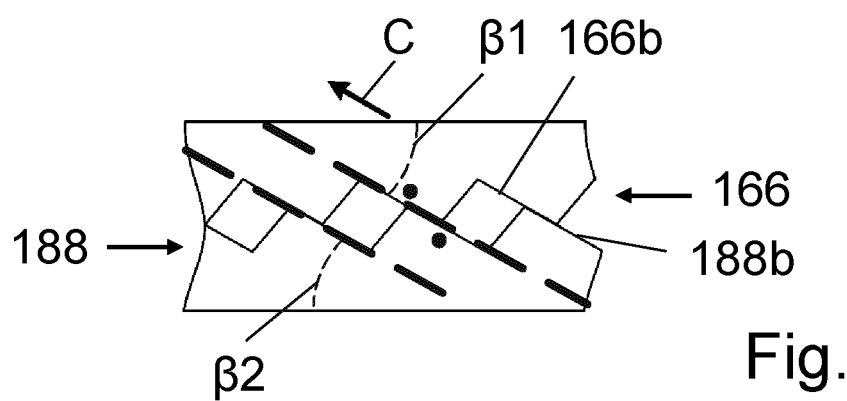

FIG. 12D schematically shows a further state after the end of dose dispense, wherein a new dose is set. The drive sleeve 160 is rotated in the dose increase rotational direction and at the same time moves in the proximal direction. This helical movement of the drive sleeve 160 during dose setting is indicated with an arrow C in FIG. 12D. A pitch of this helical movement of the drive sleeve 160 corresponds to the second pitch of the inner thread 61. Accordingly, this pitch corresponds to the pitch of the helical movement of the number sleeve 20 with regard to the housing 10 during dose setting. A dose setting pitch angle β (not shown) corresponds to said helical movement of the second engagement means (i.e. the lock teeth ring 166) with regard to the first engagement means (i.e. the first teeth ring 188) during dose setting. The dose setting pitch angle β is defined as the smaller angle between a trajectory of said helical movement with regard to the perpendicular plane.

The first engagement member 185 does not move during dose setting. Starting from the state at the end of dose dispense (no dose is set, zero dose), which is shown in FIG. 12C, the lock teeth ring 166 is lift off from the first teeth ring 185 as soon as the dose is increased from zero. Hence, the lock teeth ring 166 is disengaged from the first teeth ring 185. In FIG. 12D, the set dose has been increased to a small set dose and hence the lock teeth ring 166 has already been displaced a small distance out of its engagement with the first teeth ring 188.

Each tooth of the lock teeth ring 166 comprises a first engagement surface 166*a* that is tilted with a first inclination angle α1. The first inclination angle α1 is defined as the smaller angle between the first engagement surface 166*a* and the perpendicular plane. In general, the first inclination angle α1 is equal to or smaller than the dose dispense pitch angle α. Hence, the first engagement surface 166*a* does not impair the distal movement of the drive sleeve 160 during dose dispense, in particular shortly before the end of dose dispense.

Further, each tooth of the lock teeth ring 166 comprises a second engagement surface 166*b* that is tilted with a second inclination angle β1. The second inclination angle β1 is defined as the smaller angle between the second engagement surface 166*b* and the perpendicular plane. In general, the first inclination angle β1 is equal to or smaller than the dose setting pitch angle β. Hence, the second engagement surface 166*b* does prevent or impair the helical movement of the drive sleeve 160 during dose setting, in particular at the beginning of dose setting.

Similarly, each tooth of the first teeth ring 188 comprises a first engagement surface 188*a* that is tilted with a first inclination angle α2. The first inclination angle α2 is defined as the smaller angle between the first engagement surface 188*a* and the perpendicular plane. In general, the first inclination angle α2 is equal to or smaller than the dose dispense pitch angle α. Hence, the first engagement surface 188*a* does not impair the distal movement of the drive sleeve 160 during dose dispense, in particular shortly before the end of dose dispense.

In this example, the first inclination angle α1 and the first inclination angle α2 are both equal to the dose dispense pitch angle α. Hence, it is not necessary to indicate the dose dispense pitch angle α in FIGS. 12A and 12B explicitly. The first engagement surfaces 166*a* of the lock teeth ring 166 slide down the first engagement surfaces 188*a* of the first teeth ring 188 shortly before the end of dose dispense. However, as these three angels are equal to each other, no substantial resistance occurs.

Further, each tooth of the first teeth ring 188 comprises a second engagement surface 188*b* that is tilted with a second inclination angle β2. The second inclination angle β2 is defined as the smaller angle between the second engagement surface 188*b* and the perpendicular plane. In general, the second inclination angle β2 is equal to or smaller than the dose setting pitch angle β. Hence, the second engagement surface 188*b* does prevent or impair the helical movement of the drive sleeve 160 during dose setting, in particular at the beginning of dose setting.

Preferably, the first inclination angle α1 is equal to the first inclination angle α2. In this case, each first engagement surface 166*a* of the lock teeth ring 166 lies flat on the respective first engagement surface 188*a* of the first teeth ring 188 at the end of dose dispense (see FIG. 12C). Additionally or alternatively, the second inclination angle β1 is equal to the first inclination angle β2. In this case, each second engagement surface 166*b* of the lock teeth ring 166 lies flat on the respective second engagement surface 188*b* of the first teeth ring 188 at the end of dose dispense (see FIG. 12C).

In this example, the second inclination angle β1 and the first inclination angle β2 are both equal to the dose setting pitch angle β. Hence, it is not necessary to indicate the dose setting pitch angle β in FIG. 12D explicitly. Hence, the second engagement surfaces 188*b* of the lock teeth ring 166 slide up the second engagement surfaces 188*b* of the first teeth ring 188 at the beginning of dose setting. However, as these three angels are equal to each other, no substantial resistance occurs.

Preferably, a spacing of adjacent teeth of the lock teeth ring 166 corresponds to one dosage unit. Additionally or alternatively, a spacing of adjacent teeth of the first teeth ring 188 corresponds to one dosage unit as well. Naturally, it is only necessary that either the lock teeth ring 166 or the first teeth ring 188 is complete. For example, in a modification, the lock teeth ring 166 may consist of a full annular set of lock teeth with the spacing according to one dosage unit, whereas only at least one first tooth is provided instead of the complete first teeth ring 188, for example only one first tooth or only two first teeth.

The drug delivery device 1 with the dosing mechanism according to the first embodiment or the second embodiment also comprises an end-of-content mechanism (EOC mechanism), respectively. The EOC mechanism prevents that a dose can be set which exceeds the amount of medicament remaining in the cartridge 19.

On an outer circumferential surface of the drive sleeves 60 and 160, an outer thread 64 engaging an inner thread of a last dose nut 65 is formed. In particular, the outer thread 64 extends in the axial direction between a proximal side of the distal flange 63 and a distal side of the proximal flange 68. The last dose nut 65 is splined to the housing 10. Hence, the last dose nut 65 is rotationally fixed to the housing 10 but axially movable with respect to the housing 10. During dose setting, the drive sleeve 60 or 160 rotates relative to the last dose not 65. When the set dose is increased, due to the threaded engagement of the last dose nut 65 with the outer thread 64, the last dose nut 65 also travels in the proximal direction with regard to the drive sleeve 60 or 160. While the set dose is ejected during dose dispense, the drive sleeve 60 or 160 does not rotate with respect to the housing 10 and the last dose nut 65. Hence, the last dose nut 65 is displaced in the distal direction together with the drive sleeve 60 or 160. The axial position of the last dose nut 65 relative to the drive sleeve 60 or 160 does only change during dose setting but not during dose dispense. A maximum travel distance of the last dose nut 65 between the distal flange 63 and the proximal flange 68 corresponds to the amount of medicament in the cartridge 19 when the cartridge 19 is full. If the user tries to increase the set dose during dose setting to a value exceeding the amount of medicament remaining in the cartridge 19, the last dose nut 65 abuts the distal side of the proximal flange 68 and/or a rotational stop feature formed thereon. Thereby, further movement of the drive sleeve 60 or 160 in the dose increase rotational direction and in the proximal direction is prevented. Consequently, the set dose cannot be increased any further.

It is noted that the dosing mechanisms according to the first embodiment and the second embodiment do not include a movement application component in terms of the present disclosure.

Figure 13:
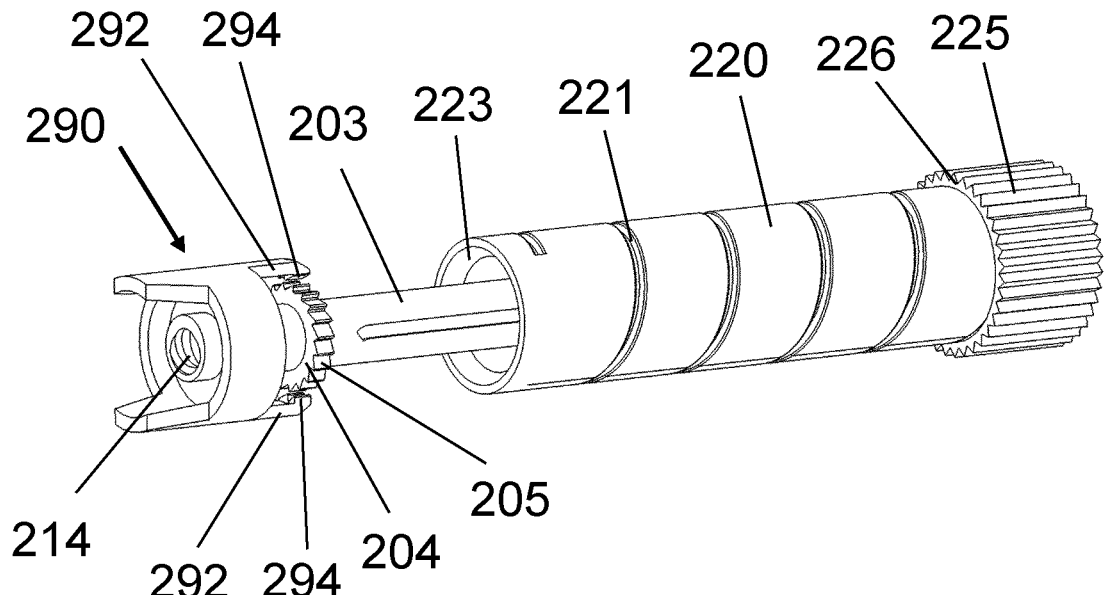
FIG. 13 is a perspective view of a rotational end stop mechanism of a third embodiment of a dosing mechanism according to the present disclosure during dose dispense.
Figure 14:
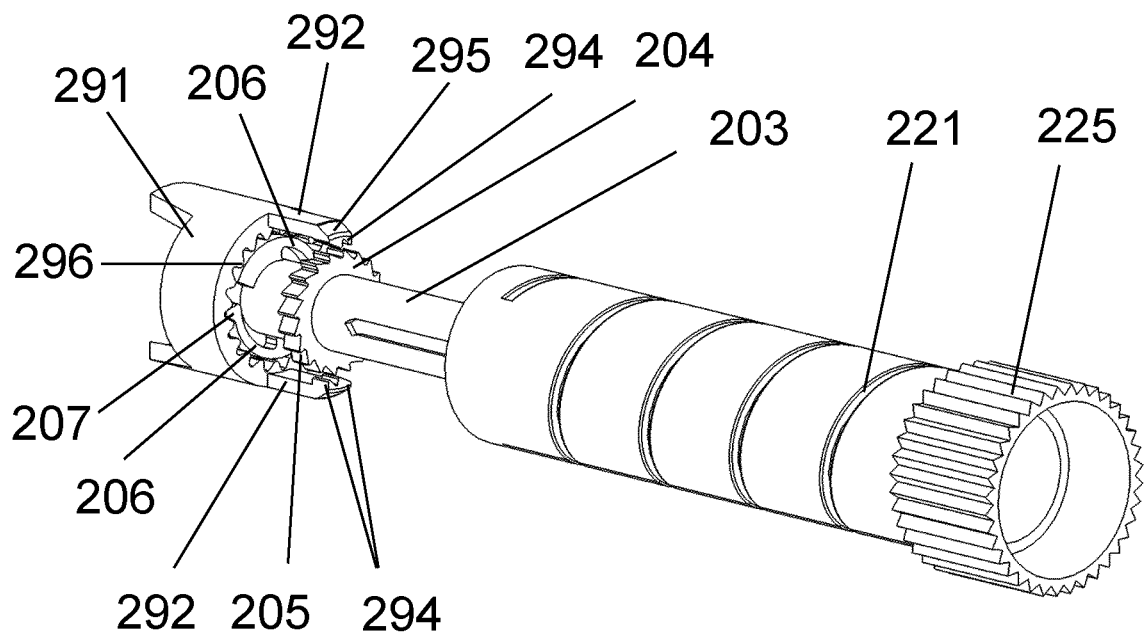
FIG. 14 shows the rotational end stop mechanism of FIG. 13 from another perspective.
Figure 17:
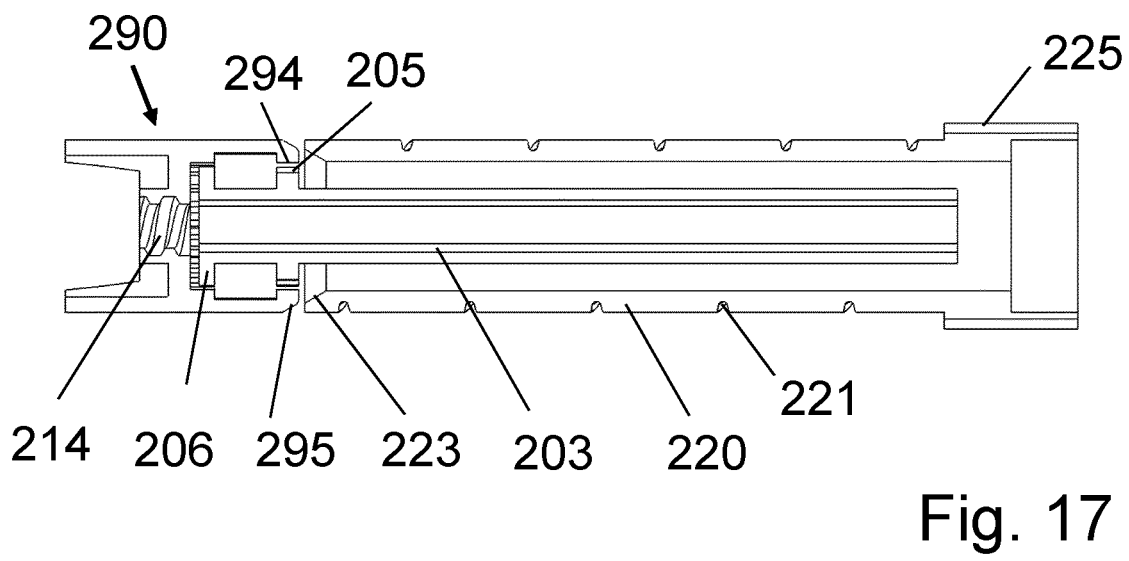
FIG. 17 is a cross-sectional side view of the rotational end stop mechanism of FIG. 13 in a state during dose dispense shortly before the end of dispense, wherein the second engagement means not yet engage the first engagement means.

FIGS. 13, 14 and 17 show a rotational end stop mechanism of a third embodiment of a dosing mechanism according to the present disclosure during dose dispense. In more detail, a dose setting unit, a piston rod sleeve 203, and a second engagement means insert 290 of the third embodiment are shown. The dose setting unit consists of a number sleeve 220 and a dose setting ring 225, which is fixed to a distal end of the number sleeve 220. In more detail, the dose setting ring 225 is formed integrally with the number sleeve 220 in this example.

The second engagement means insert 290 is directly axially and radially fixed to a housing (not shown). The second engagement means insert 290 comprises a central passage for inserting a piston rod (not shown). The inner passage includes an inner thread 214 that is threadedly engaged with an outer thread of the piston rod. During dose dispense, the piston rod is rotated via the piston rod sleeve 203 in a dispense rotational direction and thereby is advanced in a distal direction by the threaded engagement with the inner thread 214 of the second engagement means insert 290.

In the third embodiment, the piston rod sleeve 203 constitutes a movement application component in terms of the present disclosure. The piston rod sleeve 203 comprises a piston rod mounting 208. The piston rod mounting 208 has an oblong cross-sectional shape. The piston rod has a corresponding cross-sectional shape. Hence, the piston rod is axially movable in the piston rod mounting 208 but is directly rotationally engaged to the piston rod sleeve 203.

Figure 15:
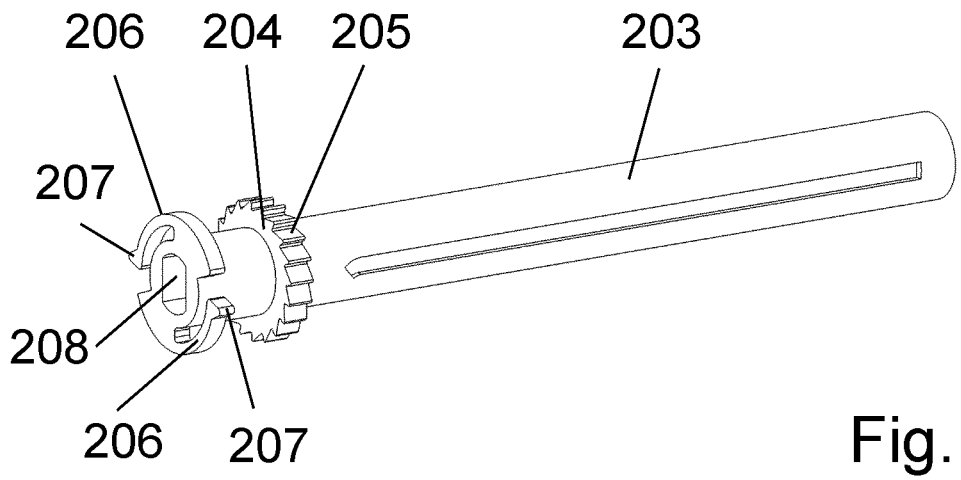
FIG. 15 is a perspective view of a piston rod sleeve of FIG. 13, wherein a flange is integrally formed with the piston rod sleeve and comprises a first teeth ring as a first engagement means on its outer circumference.

Two flexible ratchet arms 206 are formed integrally with the piston rod sleeve 203 at a distal end of the piston rod sleeve 203. At an radially outer end of each ratchet arm 206, a ratchet teeth 207 is formed integrally with the respective ratchet arm 206 (see FIG. 15). The distal end of the drive sleeve 203 with the ratchet arms 206 is inserted into a proximal recess of the second engagement means insert 290 (see FIG. 14). A ratchet teeth ring 296 is integrally formed with the second engagements insert 290 at a sidewall of the recess (see FIG. 16). The ratchet teeth 207 engage the ratchet teeth ring 296, respectively. By this engagement, the piston rod sleeve 203 is prevented from rotation opposite to the dispense rotational direction. In particular, the piston rod sleeve 203 cannot rotate in a dose increase rotational direction together with the dose setting unit when the set dose is increased during dose setting because the dose increase rotational direction is opposite to the dispense rotational direction in this embodiment. When the piston rod sleeve 203 rotates in the dispense rotational direction with respect to the housing, the flexible arms 206 are deflected inwardly and the ratchet teeth 207 slide over the ratchet teeth ring 296. Thereby, audible click sounds are generated. Preferably, a spacing of adjacent ratchet teeth of the ratchet teeth ring 296 corresponds to one dosage unit, respectively. Hence, the user gets an audible feedback how many dosage units are ejected during dose dispense.

The housing and a driving mechanism for rotating the piston rod sleeve 203 in the dispense rotational direction for dose dispense are not shown or discussed in detail. The shown rotational end stop mechanism is suitable, for example, for a dosing mechanism and drug delivery device as described in WO 99/38554 A1, in particular the embodiment of FIGS. 15 to 17 of this document.

On a radially outer surface of the number sleeve 220, helical grooves are formed. The helical grooves constitute an outer thread 221 of the number sleeve 220. The number sleeve 220 is threadedly engaged to an inner thread of the housing (not shown). During dose setting, the number sleeve 220 helically winds out of the housing in a proximal direction and in the dose increase rotational direction when the set dose is increased. Accordingly, the number sleeve 220 helically winds back into the housing in a distal direction and in a dose decrease rotational direction when the set dose is decreased. In other words, the number sleeve also moves in the distal direction during dose setting.

At a distal end of the dose setting ring 225, a radial step is provided. The radially outer surface of the number sleeve 220 is recessed in the radial direction with regard to an radially outer surface of the dose setting ring 225. The resulting edge constitutes an axial stop means 326 for terminating the corresponding movement of the dose setting unit with respect to the housing at the end of dose dispense. For this, the axial stop means 326 abuts on a distal end side of the housing at the end of dose dispense. Of course, the axial stop means 326 also abuts on the distal end side of the housing when the set dose is decreased back to zero during dose setting (no dose is set).

Furthermore, as in the first embodiment, visual indications relating to the set dose are provided on the radially outer surface of the number sleeve 220.

A dispense knob (not shown) is mounted in the dose setting ring 225. The user has to press the dispense knob in the distal direction for dose dispense. During dose dispense, the number sleeve 220 is wound back into the housing as well. The rotation of the drive sleeve 220 in the dose decrease rotational direction is transferred to the piston rod sleeve via the driving mechanism (not shown) during dose dispense. With regard to a suitable driving mechanism, it is referred to WO 99/38554 A1, especially to the embodiment shown in FIGS. 15 to 17 thereof.

In particular, the driving may comprise a bushing, wherein the piston sleeve 203 is inserted into the bushing and is rotationally fixed to the bushing. The bushing is axially displaceable with respect to the housing. It is drawn in the proximal direction during dose setting by the dose setting unit when the set dose is increased. The bushing does not rotate during dose setting. Rotation of the bushing in the dose decrease rotational direction is prevented as a resistance of the engagement between the ratchet teeth 207 and the ratchet teeth ring 296 against rotation in this direction is higher than a resistance against relative rotation of the dose setting unit in the dose decrease rotational direction with respect to the bushing caused by a dose decrease clicker mechanism. Accordingly, the dose setting unit rotates in the dose decrease rotational direction with respect to the bushing when the set dose is decreased during dose setting, while the dose decrease clicker mechanism produces an audible click for each dosage unit by which the set dose is reduced.

The dosing mechanism according to the third embodiment comprises a clutch mechanism (not shown) for rotationally coupling the driving mechanism to the dose setting unit for dose dispense. In more detail, the clutch mechanism rotationally couples the bushing to the dose setting unit as long as the dispense knob is pressed. In other words, during dose dispense, relative rotation between the dose setting unit and the bushing is prevented by the clutch mechanism. When the dispense knob is not pressed (for example during dose setting), the clutch mechanism does not prevent relative rotation between the dose setting unit and the bushing.

The rotational end stop mechanism of the third embodiment comprises an annular first teeth ring 205 which is integrally formed with the piston rod sleeve (movement application component) 203. In more detail, a flange 204 is integrally formed with the piston rod sleeve 203 near to the distal end of the piston rod sleeve 203. The first teeth ring 205 is integrally formed outer circumference (a radially outer surface) of the flange. As the piston rod sleeve 203 is directly rotationally fixed to the piston rod, the same is true for the first teeth ring 205. As the piston rod sleeve 203 is axially fixed to the housing, the same is true for the first teeth ring 205 as well.

In this third embodiment, the first teeth ring 205 constitutes a first engagement means in terms of the present disclosure.

Figure 16:
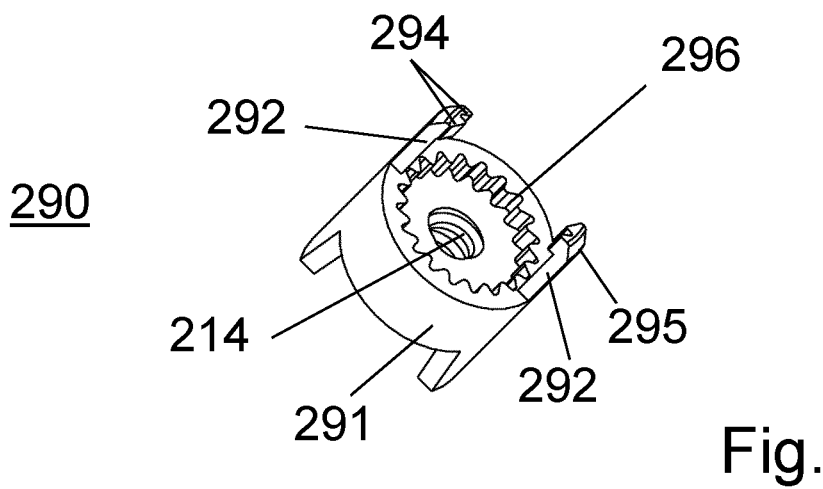
FIG. 16 is a perspective view of a second engagement means insert of FIG. 13 comprising a central passage with an inner thread for engaging a piston rod (not shown) and two flexible arms extending in a proximal direction, wherein two teeth are provided at a radially inward side at a proximal tip of each of the flexible arms as a second engagement means.

The rotational end stop mechanism of the third embodiment further includes the second engagement means insert 290 (see FIG. 16). The second engagement means insert 290 comprises a ring-shaped element 291, which is axially and rotationally fixed to the housing. Two flexible arms 292 extend from the ring-shaped element 291 in the proximal direction. In this specific example, no recesses like the recesses 93 of the flexible arms 92 of the first embodiment are provided. However, according to a modification of the third embodiment, the flexible arms 292 may include similar recesses as well.

At each of the flexible arms 292, next to a proximal tip portion, a single lock tooth 294 is integrally formed. The two lock teeth 294 of the different flexible arms 292 are facing each other. In other words, the lock teeth 294 are formed on an inner side of the respective flexible arm 292 in the radial direction. A shape of the lock teeth 294 corresponds to a shape of the teeth of the first teeth ring 205. For each flexible arm 292, an outer side of the flexible arm 292 in the radial direction is tapered at the proximal tip portion. Hence, a tapered surface 295 is formed at the tip portion. Preferably, the shape of the tapered surfaces 295 corresponds at least substantially to a shape of an internal cone 223 that is formed at a distal end surface of the number sleeve 220.

In the third embodiment, the lock teeth 294 constitute second engagement means in terms of the present disclosure, respectively. As the second engagement means insert 290 is directly rotationally and axially fixed directly to the housing, the same applies with regard to the lock teeth 294, which are formed integrally with the second engagement means insert 290. However, the lock teeth 294 are displaced minimally in the distal direction when the corresponding flexible arms 292 are deflected radially inwardly. Furthermore, the lock teeth 294 are displaceable in a radial direction perpendicular to the axial direction.

The first teeth ring (first engagement means) 205 is located between the two flexible arms 292. Each of the lock teeth 294 faces the first teeth ring 205 (see FIGS. 13, 14, and 17).

As noted above, an internal cone 223 is formed at a distal end surface of the number sleeve 220. The internal cone 223 is adapted for engaging the second engagement means with the first engagement means only when the number sleeve 220 is in its most distal position. This is described in more detail in the following.

FIG. 17 shows the rotational end stop mechanism in a state during dose dispense shortly before the end of dose dispense. However, dose dispense has not yet terminated and the number sleeve 220 has not yet reached its most distal position but continues to move in the distal direction. As noted above, at the same time, the number sleeve 220 also rotates in the dose decrease rotational direction, which is identical to the dispense rotational direction in this embodiment.

In FIG. 17, the internal cone 223 is spaced from the flexible arms 292 and it does not yet engage the flexible arms 292. The flexible arms 292 are not deflected and the lock teeth 294 are not engaged with the first teeth ring 205. Consequently, the piston rod sleeve 205 and the piston rod are not prevented from further rotation in the dispense rotational direction with respect to the housing by the lock teeth (second engagement means) 294. In this meaning, the piston rod sleeve 203 and the piston rod are free to rotate in the dispense rotational direction with respect to the housing. As noted above, it is even necessary that the piston rod rotates in the dispense rotational direction during dose dispense.

At the end of dose dispense, the number sleeve 220 reaches its most distal position and engages the flexible arms 292. In particular, the internal cone 223 abuts the tapered surfaces 295 of the flexible arms 292. The internal cone 223 urges the tip portions of the flexible arms 292 radially inwardly such that the lock teeth 294 engage the first teeth ring 205. Consequently, the piston rod sleeve 203 and the piston rod, which is rotationally fixed directly to the piston rod sleeve 203, are prevented from further rotation with respect to the housing, especially from further rotation in the dispense rotational direction. The rotational end stop mechanism of the third embodiment works similar to the rotational end stop mechanism of the first embodiment.

Preferably, a distance between two adjacent first teeth of the first teeth ring 205 corresponds exactly to one dosage unit, respectively. In other words, a spacing of adjacent teeth of the first teeth ring 205 corresponds to one dosage unit.

Figure 18:
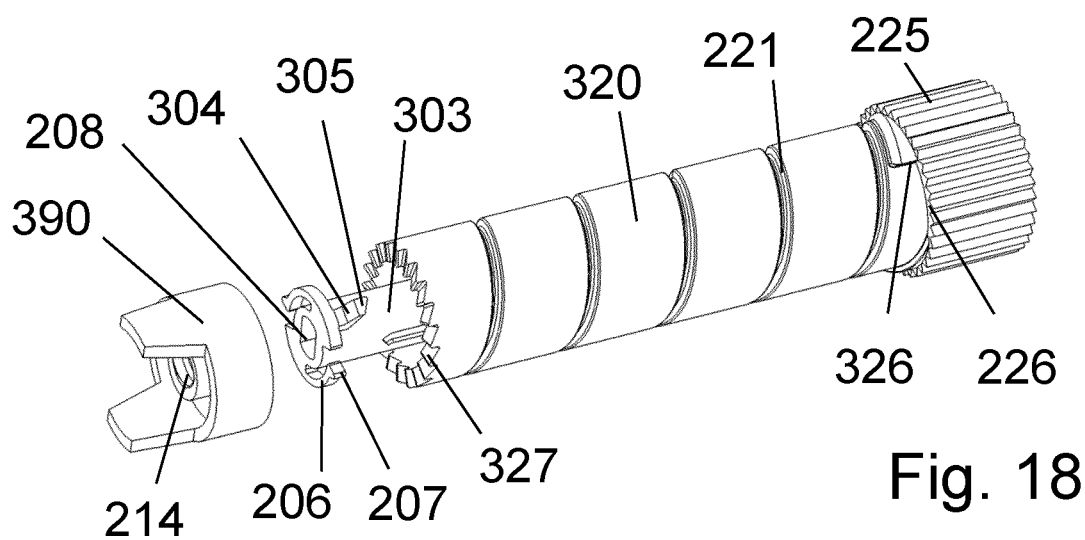
FIG. 18 is a exploded perspective view of a dose setting unit, a piston rod sleeve, and a housing insert of a fourth embodiment of a dosing mechanism according to the present disclosure, wherein two radial arms are formed integrally with the piston rod sleeve, wherein each of the radial arms comprises a first tooth facing towards a proximal direction as first engagement means, and wherein an annular lock teeth ring on a distal end surface of a number sleeve of the dose setting unit constitutes a second engagement means.
Figure 19:
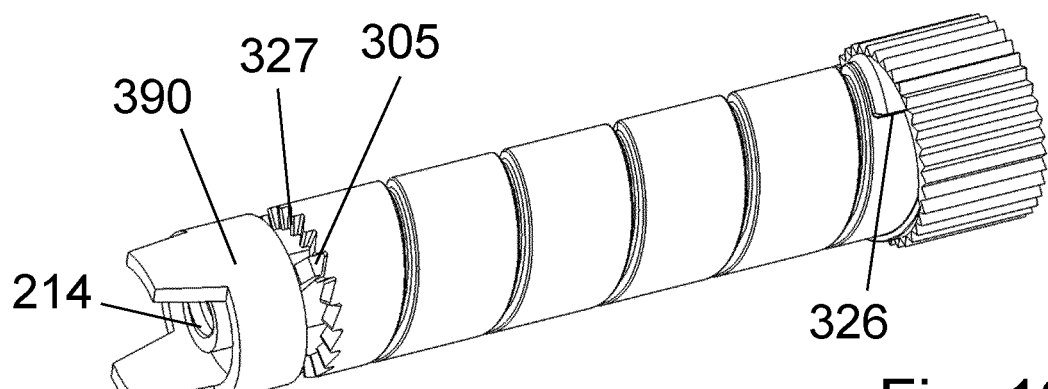
FIG. 19 is a perspective view of the dose setting unit, the piston rod sleeve, and the housing insert of FIG. 18 at the end of dose dispense, wherein the lock teeth ring of the number sleeve engages the first teeth on the radial arms to prevent further rotation of the piston rod sleeve in a dispense rotational direction.

FIGS. 18 and 19 relate to a fourth embodiment of a dosing mechanism according to the present disclosure. Unless otherwise specified, the fourth embodiment is identical to the third embodiment and is not described again. The same reference signs as used with regard to the third embodiment will be used for identical parts. The fourth embodiment differs from the third embodiment basically only with regard the rotational end stop mechanism.

More specifically, FIGS. 18 and 19 show a rotational end stop mechanism and a housing insert 390 of the fourth embodiment of a dosing mechanism. FIG. 18 is an exploded perspective view of this arrangement, wherein FIG. 19 is a perspective view of the arrangement at the end of dose dispense.

In more detail, a dose setting unit, a piston rod sleeve 303, and the housing insert 390 of the fourth embodiment of the dosing mechanism are shown. The dose setting unit consists of the number sleeve 320 and a dose setting ring 225, which is fixed to a distal end of the number sleeve 320. As in the third embodiment, the dose setting ring 225 is formed integrally with the number sleeve 320 in this example.

It should be noted that the housing insert 390 is not part of the rotational end stop mechanism in the fourth embodiment. The housing insert 390 differs from the second engagement means insert 290 of the third embodiment only in that it does not comprise the flexible arms 292. Accordingly, the housing insert 390 does not include any second engagement means. Apart from that, the housing insert 390 is identical to the second engagement insert 290.

A dose dispense end stop of the dose setting unit of the fourth embodiment comprises a rotational stop means 326, which is integrally formed at a distal end of the number sleeve 320. It is adapted to abut on a corresponding rotational stop means of the housing (not shown) at the end of dose dispense. The rotational stop means 326 is more precise than the axial stop means 226 of the third embodiment. However, in general, the rotational stop means 326 is not essential and the fourth embodiment could also rely on an axial stop means like the third embodiment.

In the fourth embodiment, an annular lock teeth ring 327 is formed at a distal end of the number sleeve 320. In more detail, the annular lock teeth ring 327 is formed integrally with the number sleeve 320. The annular lock teeth ring 327 constitutes a second engagement means. As the number sleeve 320 is prevented from further rotation in the dose decrease rotational direction, which is identical to the dispense rotational direction, by the rotational stop means 326 at the end of dose dispense, this also applies for the lock teeth ring 327. Preferably, a spacing of adjacent teeth of the lock teeth ring 327 corresponds to one dosage unit.

Further, in the fourth embodiment, two radial arms 304 are provided at a distal end of the piston rod sleeve 303. The two radial arms 304 extend radially outwards from the piston rod sleeve 303 in opposite lateral sides. They are integrally formed with the piston rod sleeve 303. At the radial outer end of each radial arm 304, a single first tooth 305 is provided, respectively. Apart from this, the piston rod sleeve 303 of the fourth embodiment differs from the piston rod sleeve 203 of the third embodiment only in that the flange 204 with the first teeth ring 205 is omitted. Due to the perspective, only one radial arm 304 of the two radial arms 304 can be seen in FIGS. 18 and 19, respectively.

In the fourth embodiment, the first teeth 305 constitute a first engagement means. As described above with regard to the piston rod sleeve 203 of the third embodiment, the piston rod sleeve 303 is directly rotationally fixed to the piston rod. As the first teeth 305 are formed integrally with the piston rod sleeve 303, the same is true with regard to the first teeth 305. As the piston rod sleeve 303 is axially fixed with respect to the housing, this also applies for the first teeth 305.

Only when the number sleeve 320 is in its most distal position, the first teeth 305 engage the lock teeth ring 327. This is especially the case at the end of dose dispense. As the number sleeve 320 is prevented from further rotation in the dispense rotational direction with regard to the housing at the end of dose dispense by the dose dispense end stop, the engagement of the first teeth 305 with the lock teeth ring 327 also prevents the first teeth, the piston rod sleeve 303, and finally the piston rod from further rotation in the dispense rotational direction with regard to the housing at the end of dose dispense.

In the fourth embodiment, the rotational end stop mechanism uses the dose dispense end stop of the dose setting unit for locking the piston rod sleeve 303 from further rotation in the dispense rotational direction at the end of dose dispense. The rotational end stop mechanism hence bypasses the bushing of the driving mechanism (not shown) at the end of dose dispense. The bushing is an intermediate component of a kinematic chain of the driving mechanism. In particular, during dose dispense, the bushing transmits the rotation from the dose setting unit to the piston rod sleeve 303. With the rotational end stop mechanism of the fourth embodiment, the dose dispense end stop is transmitted more directly, more reliable, and more precisely to the piston rod sleeve 303. Any tolerances regarding the interaction between the piston rod sleeve 303 and the bushing and between the bushing and the dose setting unit cannot longer impair the accurate transmission of the dose dispense end stop to the piston rod sleeve (movement application component) 303. Consequently, the end of dose dispense is determined more reliably and precisely. When the dosing mechanism is employed in a drug delivery device, for example in a drug delivery device according to FIGS. 15 to 17 of WO 99/38553 A1, an amount of medicament that is ejected during dose dispense is more accurate and reliable.

It should be noted that there are fewer restrictions with regard to the shapes of the teeth of the lock teeth ring 327 and the first teeth 307 as compared to the shapes of the teeth in the second embodiment. The reason is that the number sleeve 320 does not rotate with respect to the piston rod sleeve 303 during dose dispense in this embodiment. First engagement surfaces of the teeth can be almost parallel to the axial direction in this embodiment. However, the shapes of the teeth of the lock teeth ring 327 and of the first teeth 305 are configured such that the distal helical movement of the number sleeve 320 during dose dispense is not prevented or impaired even when the number sleeve 320 is in its most distal position (i.e. at the end of dose dispense and after the end of dose dispense). For this, a second inclination angle of second engagement surfaces of the teeth is equal or smaller than a pitch angle corresponding to the helical movement of the number sleeve 320 with regard to the housing, respectively.

Figure 20:
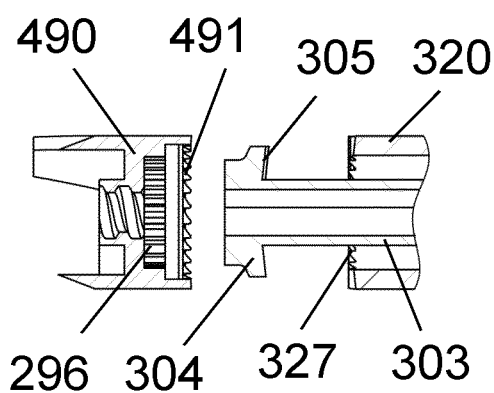
FIG. 20 is an exploded cross-sectional view of a modification of the dose setting unit, the piston rod sleeve, and the housing insert of FIG. 18 according to a fifth embodiment of a dosing mechanism according to the present disclosure, wherein a housing lock teeth ring is formed on a proximal end surface of the housing insert.
Figure 21:
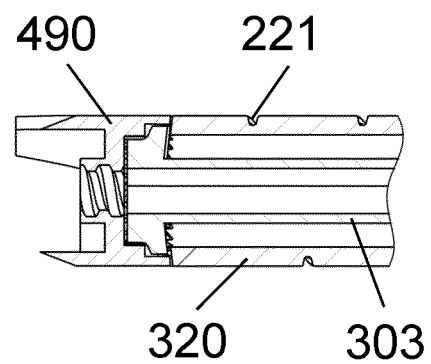
FIG. 21 is a cross-sectional side view of the modification according to FIG. 20 at the end of dose dispense, wherein the annular lock teeth ring on the distal end surface of the number sleeve engages not only the first teeth formed on the radial arms but also the housing lock teeth ring of the housing insert.

FIGS. 20 and 21 relate to a fifth embodiment of a dosing mechanism according to the present disclosure. Unless otherwise specified, the fifth embodiment is identical to the fourth embodiment and is not described again. The same reference signs as used with regard to the third embodiment and fourth embodiment will be used for identical parts. The fifth embodiment differs from the fourth embodiment only with regard to a housing insert 490.

More specifically, FIGS. 20 and 21 show a rotational end stop mechanism including a housing insert 490 of the fifth embodiment. FIG. 20 is an exploded cross-sectional side view of this arrangement, wherein FIG. 21 is a cross-sectional side view of the arrangement at the end of dose dispense.

In more detail, the number sleeve 320, the piston rod sleeve 303, and the housing insert 490 of the fifth embodiment of the dosing mechanism are shown in FIGS. 20 and 21.

The housing insert 490 differs from the housing insert 390 of the fourth embodiment by an additional annular lock teeth ring 491. Apart from that, the housing insert 490 is identical to the housing insert 390. For example, the housing insert 490 is directly axially and rotationally fixed to the housing (not shown).

In more detail, the additional annular housing lock teeth ring 491 is formed at the distal end of the housing insert 490. If the number sleeve 320 is in its most distal position, the lock teeth ring 327 does not only engage the first teeth 305 of the piston rod sleeve 303 but also engages the lock teeth ring 491. More specifically, the lock teeth ring 327 engages the lock teeth ring 491 only when the number sleeve 320 is in its most distal position. Especially, this is the case at the end of dose dispense.

The engagement from the lock teeth ring 327 with the lock teeth ring 491 prevents the number sleeve 320 from further rotation in the dispense rotational direction with respect to the housing, especially at the end of dose dispense. As noted above, the dispense rotational direction is identical to the dose decrease rotational direction. Hence, in the fifth embodiment, the lock teeth ring 327 does not only constitute the second engagement means but additionally constitutes a rotational stop means of the dose dial end stop.

It should be noted that the housing lock tooth ring 491 as such does not constitute a second engagement means in terms of the present disclosure because it does not engage the first teeth (first engagement means) 305 at the end of dose dispense directly but only via the number sleeve 320. In fact, the housing lock tooth ring 491 constitutes a rotational end stop means of the housing for engagement with the rotational stop means constituted by the lock teeth ring 327 at the end of dose dispense. Thus, the housing lock tooth ring 491 is rather part of the dispense end stop means for terminating movement of the dose setting unit with regard to the housing at the end of dose dispense.

In the fifth embodiment, the rotational stop means 326 may be omitted or may be maintained as an additional back up.

Due to the close proximity of the housing lock tooth ring 491 to the first teeth (first engagement means) 305, a transmission path from the housing insert 490 to the piston rod sleeve 303 for stopping the rotational movement of the piston rod sleeve 303 at the end of dose dispense is very short. A stopping force for stopping the rotational movement is transmitted very directly from the housing insert 490 to the piston rod sleeve 303. Especially, the transmission path is shorter than the transmission path from the rotational stop means 326 to the first teeth 305 in the fourth embodiment. Furthermore, the rotational stop means 326 at the distal end of the number sleeve 320 is exposed to the outside if the dose is set. This makes the rotational stop means 326 prone to deposits of dirt and to damages. In both cases, the accuracy of the dose dispense end stop for the dose setting unit can be impaired. As the dose dispense end stop is employed to determine the end of dose dispense in the fourth embodiment, the accuracy of the amount of dose dispensed can be impaired accordingly. These risks are avoided or at least reduced if the housing lock tooth ring 491 is employed for the dose dispense end stop as in the fifth embodiment. Therefore, the additional lock tooth ring 491 further enhances the reliability that the accurate dose is ejected.

In the first embodiment, the second engagement means (lock teeth 94) is permanently prevented from rotation with respect to the housing 10. The same is true for the second engagement means (lock teeth 294) of the third embodiment. In contrast, the second engagement means (lock teeth ring 166) of the second embodiment is prevented only from rotation in the dispense rotational direction with respect to the housing 10 and only when the drive sleeve 160 is in its most distal position. Accordingly, in the fourth and fifth embodiment, the second engagement means (lock teeth ring 327) is prevented only from rotation in the dispense rotational direction with respect to the housing and only when the number sleeve 320 is in its most distal position.

Preferably, a spacing of adjacent teeth of the housing lock teeth ring 491 corresponds to one dosage unit.

In the first embodiment and the second embodiment, at the end of dose dispense, an independent force transmission path from the housing 10 to the piston rod 80 for preventing further rotation of the piston rod 80 in the dispense rotational direction is closed by the engagement of the respective second engagement means with the respective first engagement means. The same applies with regard to the third embodiment. In these cases, the rotational end stop mechanism is independent from the dose dispense end stop for the dose setting unit.

In the fourth embodiment and the fifth embodiment, engagement of the second engagement means (lock teeth ring 327) with the first engagement means (first teeth 305) closes an additional transmission path from the dose dispense end stop (including the rotational stop means 326 and/or the housing lock tooth ring 491) to the piston rod sleeve 303. In this regard, the bushing as the intermediate component of the driving mechanism is bypassed when the number sleeve 320 is in its most distal position, which occurs at the end of dose dispense. In fact, the complete kinematic chain of the driving mechanism is bypassed in both embodiments because the dose setting unit is directly coupled to the movement application component.

In every embodiment, the rotational end stop mechanism ensures a more controlled, more precisely defined, and more reliable end of dose dispense. Consequently, the reliability and accuracy of the respective dosing mechanisms are improved.

LIST OF REFERENCE SIGNS 1 drug delivery device
10 housing
11 cartridge holder
12 insert
12a inner thread
13 transversal wall
14, 214 inner thread
15 snap-in means
16 axial groove
17 window
18 pen cap
19 cartridge
20, 220, 320 number sleeve
21, 221 outer thread
22 ratchet grooves
25, 225 dose setting ring
26, 326 rotational stop means
30 dispense knob
40 coupling sleeve
41 ratchet arm
50 spring washer
60 driving sleeve
61 inner thread
62 internal cone
63 proximal flange
64 outer thread
65 last dose nut
67 spline groove
80 piston rod
81 first outer thread
82 pressing foot
83 axial groove
84 second outer thread
85, 185 first engagement member
86 snap-in means
87 notch means
88, 188, 205 first teeth ring (first engagement means)
89 central passage
90, 290 second engagement means insert
91, 291 ring-shaped element
92, 292 flexible arm
93 recess
94, 294 lock tooth (second engagement means)
95, 295 tapered surface
166 lock teeth ring (second engagement means)
166a, 188a first engagement surface
166b, 188b second engagement surface
203, 303 piston rod sleeve
204 flange
206 ratchet arm
207 ratchet tooth
208 piston rod mounting 223 internal cone
226 axial stop means
296 ratchet teeth ring
304 radial arm
305 first tooth (first engagement means)
327 lock teeth ring (second engagement means)
390, 490 housing insert
491 housing lock tooth ring
A, B, C arrow
α1, α2 first inclination angle
β1, β2 second inclination angle

The invention claimed is:

1. A dosing mechanism for a drug delivery device for selecting and dispensing user-variable doses of a medicament, the dosing mechanism comprising:
   a housing;
   a piston rod;
   a driving mechanism for rotating one or both of the piston rod and a movement application component that is directly engaged with the piston rod in a dispense rotational direction with respect to the housing for dose dispense; and
   a rotational end stop mechanism for terminating dose dispense, the rotational end stop mechanism comprising:
      a first engagement means that is rotationally fixed with respect to one or both of the piston rod and the movement application component, and
      a second engagement means that is prevented from rotation with respect to the housing in the dispense rotational direction at an end of the dose dispense,
   wherein the second engagement means is not directly engaged with the first engagement means during dose dispense, and
   wherein the second engagement means, at the end of dose dispense, directly engages the first engagement means and constitutes a rotational stop for the first engagement means to prevent the first engagement means from further rotation in the dispense rotational direction with respect to the housing.

2. The dosing mechanism according to claim 1, further comprising a dose setting unit that is rotatable in a dose increase rotational direction with respect to the housing for increasing a set dose during dose setting and that is configured to rotate in a dose decrease rotational direction with respect to the housing during dose dispense,
   wherein the dose decrease rotational direction is opposite to the dose increase rotational direction,
   wherein the dose setting unit comprises a number sleeve that is threadedly engaged with the housing, and
   wherein the number sleeve is adapted for moving in a distal direction during dose dispense and to reach a most distal position at the end of dose dispense.

3. The dosing mechanism according to claim 1, wherein the first engagement means comprises at least one first tooth and the second engagement means comprises at least one lock tooth.

4. The dosing mechanism according to claim 1, wherein the first engagement means is axially fixed with respect to the housing.

5. The dosing mechanism according to claim 1, further comprising a first engagement member that is directly rotationally fixed to the piston rod and comprises the first engagement means, wherein the piston rod is axially displaceable with respect to the first engagement member.

6. The dosing mechanism according to claim 1, wherein the driving mechanism and/or the dose setting unit are configured to bring the second engagement means into engagement with the first engagement means at the end of dose dispense.

7. The dosing mechanism according to claim 1, wherein the driving mechanism comprises a drive sleeve, wherein the drive sleeve is adapted for moving in the distal direction during dose dispense and reaches a most distal position at the end of dose dispense.

8. The dosing mechanism according to claim 1, wherein the second engagement means is at least rotationally fixed with respect to the housing.

9. The dosing mechanism according to claim 8, wherein the housing comprises a second engagement means insert, wherein the second engagement means insert comprises an at least substantially ring-shaped element that is fixed to the housing, wherein at least one flexible arm extends from the ring-shaped element in a proximal direction, and wherein each flexible arm comprises at least one second engagement means.

10. The dosing mechanism according to claim 9, wherein the driving mechanism and/or the dose setting unit are configured to bring the second engagement means into engagement with the first engagement means at the end of dose dispense, wherein the driving mechanism comprises a drive sleeve, wherein the drive sleeve is adapted for moving in the distal direction during dose dispense and reaches a most distal position at the end of dose dispense, wherein an internal cone is formed at a distal end of the drive sleeve, and wherein the internal cone engages the at least one flexible arm only when the drive sleeve is in its most distal position at the end of dose dispense such that the at least one flexible arm is deflected inwardly, thereby urging the second engagement into engagement with the first engagement means.

11. The dosing mechanism according to claim 9, further comprising a dose setting unit that is rotatable in a dose increase rotational direction with respect to the housing for increasing a set dose during dose setting and that is configured to rotate in a dose decrease rotational direction with respect to the housing during dose dispense,
   wherein the dose decrease rotational direction is opposite to the dose increase rotational direction,
   wherein the dose setting unit comprises a number sleeve that is threadedly engaged with the housing,
   wherein the number sleeve is adapted for moving in a distal direction during dose dispense and to reach a most distal position at the end of dose dispense,
   wherein the driving mechanism and/or the dose setting unit are configured to bring the second engagement means into engagement with the first engagement means at the end of dose dispense,
   wherein an internal cone is formed at a distal end of the number sleeve, and
   wherein the internal cone engages the at least one flexible arm only when the number sleeve is in its most distal position at the end of dose dispense such that the at least one flexible arm is deflected inwardly, thereby urging the second engagement means into engagement with the first engagement means.

12. The dosing mechanism according to claim 7, wherein the driving mechanism and/or the dose setting unit are configured to bring the second engagement means into engagement with the first engagement means at the end of dose dispense, wherein the second engagement means is formed on a distal end of a drive sleeve of the driving mechanism, and wherein the drive sleeve is prevented from rotation with respect to the housing at least at the end of dose dispense.

13. The dosing mechanism according to claim 6, further comprising a dose setting unit that is rotatable in a dose increase rotational direction with respect to the housing for increasing a set dose during dose setting and that is configured to rotate in a dose decrease rotational direction with respect to the housing during dose dispense, wherein the dose decrease rotational direction is opposite to the dose increase rotational direction, wherein the dose setting unit comprises a number sleeve that is threadedly engaged with the housing, wherein the number sleeve is adapted for moving in a distal direction during dose dispense and to reach a most distal position at the end of dose dispense, wherein the dosing mechanism comprises a dose dispense end stop for the dose setting unit, wherein the dose dispense end stop is configured for terminating movement of the dose setting unit with regard to the housing at the end of dose dispense, wherein the driving mechanism is configured for transmitting a rotational movement and/or a distal movement of the dose setting unit for rotating the piston rod and/or the movement application component in the dispense rotational direction during dose dispense, and wherein at least one intermediate component of a kinematic chain of the driving mechanism is mechanically bypassed at the end of dose dispense due to the engagement of the second engagement means with the first engagement means.

14. The dosing mechanism according to claim 1, further comprising a reduction mechanism, wherein a total distal movement of the piston rod during dose dispense is proportional to a total distal movement of the dose setting unit during dose dispense multiplied by a reduction factor.

15. A drug delivery device for selecting and dispensing user-variable doses of a medicament, wherein the drug delivery device comprises a dosing mechanism for a drug delivery device for selecting and dispensing user-variable doses of a medicament, the dosing mechanism comprising:

a housing;

a piston rod;

a driving mechanism for rotating one or both of the piston rod and a movement application component that is directly engaged with the piston rod in a dispense rotational direction with respect to the housing for dose dispense; and a rotational end stop mechanism for terminating dose dispense, the rotational end stop mechanism comprising:

a first engagement means that is rotationally fixed with respect to one or both of the piston rod and the movement application component, and a second engagement means that is prevented from rotation with respect to the housing in the dispense rotational direction at an end of the dose dispense, wherein the second engagement means is not directly engaged with the first engagement means during dose dispense, and wherein the second engagement means, at the end of dose dispense, directly engages the first engagement means and constitutes a rotational stop for the first engagement means to prevent the first engagement means from further rotation in the dispense rotational direction with respect to the housing.

16. The drug delivery device of claim 15, wherein the dosing mechanism further comprises a dose setting unit that is rotatable in a dose increase rotational direction with respect to the housing for increasing a set dose during dose setting and that is configured to rotate in a dose decrease rotational direction with respect to the housing during dose dispense, wherein the dose decrease rotational direction is opposite to the dose increase rotational direction, wherein the dose setting unit comprises a number sleeve that is threadedly engaged with the housing, and wherein the number sleeve is adapted for moving in a distal direction during dose dispense and to reach a most distal position at the end of dose dispense.

17. The drug delivery device of claim 15, wherein the first engagement means comprises at least one first tooth and the second engagement means comprises at least one lock tooth.

18. The drug delivery device of claim 15, wherein the first engagement means is axially fixed with respect to the housing.

19. The drug delivery device of claim 15, wherein dosing mechanism further comprises a first engagement member that is directly rotationally fixed to the piston rod and comprises the first engagement means, and wherein the piston rod is axially displaceable with respect to the first engagement member.

20. The drug delivery device of claim 15, wherein the driving mechanism and/or the dose setting unit are configured to bring the second engagement means into engagement with the first engagement means at the end of dose dispense.

* * * * *